United States Patent
Sato et al.

(10) Patent No.: US 10,588,008 B2
(45) Date of Patent: Mar. 10, 2020

(54) CONTROL APPARATUS, CONTROL SYSTEM, AND METHOD FOR CONTROLLING CONTROL APPARATUS

(71) Applicant: Olympus Corporation, Hachioji-shi, Tokyo (JP)

(72) Inventors: Akinobu Sato, Hachioji (JP); Toshihiro Ogata, Hachioji (JP); Kazuhiro Sato, Sagamihara (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 67 days.

(21) Appl. No.: 15/705,238

(22) Filed: Sep. 14, 2017

(65) Prior Publication Data

US 2018/0084397 A1 Mar. 22, 2018

(30) Foreign Application Priority Data

Sep. 16, 2016 (JP) .................................. 2016-181393

(51) Int. Cl.
*H04N 5/232* (2006.01)
*G06F 3/048* (2013.01)
(Continued)

(52) U.S. Cl.
CPC ........ *H04W 8/005* (2013.01); *G06F 3/04817* (2013.01); *H04N 5/23216* (2013.01);
(Continued)

(58) Field of Classification Search
CPC ..... G06F 3/011; G06F 3/0482; H04N 17/002; H04N 5/23296; H04N 5/23219; H04N 5/23293
See application file for complete search history.

(56) References Cited

U.S. PATENT DOCUMENTS

2008/0297608 A1* 12/2008 Border ............... H04N 1/00204
    348/207.11
2013/0178163 A1* 7/2013 Wang ................... H04W 48/10
    455/41.2
(Continued)

FOREIGN PATENT DOCUMENTS

| CN | 104915107(A) | 9/2015 |
| CN | 105323457(A) | 2/2016 |
| JP | 2009-267666 | 11/2009 |

OTHER PUBLICATIONS

Notification of the First Office Action from corresponding Chinese Patent Application Serial No. 201710832750.9, dated Oct. 30, 2019 (8 pgs.), with English translation (15 pgs.).

*Primary Examiner* — Abdelaaziz Tissire
(74) *Attorney, Agent, or Firm* — John C. Pokotylo; Pokotylo Patent Services

(57) ABSTRACT

A control apparatus has one or more built-in functions that are selectively usable. The control apparatus includes a first communication unit conducting a first communication and a second communication unit conducting a second communication, a built-in function unit configured to execute the built-in function, and at least one control circuit. The control circuit determines which of the built-in functions is selected, determines whether there is an external device to execute an external function related to the selected built-in function based on the first communication, controls an icon display to present to a user that the selected built-in function is also executable by the external device, and causes the second communication unit to communicate with the external device through a second communication to execute the external function when the external device is selected in accordance with the icon display.

11 Claims, 16 Drawing Sheets

(51) Int. Cl.
*H04W 8/00* (2009.01)
*G06F 3/0481* (2013.01)
*H04W 4/80* (2018.01)
*H04W 76/10* (2018.01)
*G06F 3/0482* (2013.01)
*H04L 29/08* (2006.01)

(52) U.S. Cl.
CPC ....... *H04N 5/23222* (2013.01); *G06F 3/0482* (2013.01); *H04L 67/12* (2013.01); *H04W 4/80* (2018.02); *H04W 76/10* (2018.02)

(56) References Cited

U.S. PATENT DOCUMENTS

| | | | | |
|---|---|---|---|---|
| 2013/0182138 | A1* | 7/2013 | Cho | G06F 3/0482 |
| | | | | 348/211.3 |
| 2015/0381874 | A1* | 12/2015 | Wu | H04N 5/23206 |
| | | | | 348/211.2 |
| 2016/0248965 | A1* | 8/2016 | Fukuya | H04N 5/23206 |
| 2016/0366290 | A1* | 12/2016 | Hoshino | H04N 1/00225 |
| 2017/0289427 | A1* | 10/2017 | Eum | H04N 5/23206 |
| 2017/0339299 | A1* | 11/2017 | Iki | H04N 1/00973 |
| 2018/0131800 | A1* | 5/2018 | Shintani | H04W 4/80 |
| 2018/0217589 | A1* | 8/2018 | Kim | G05D 1/00 |

* cited by examiner

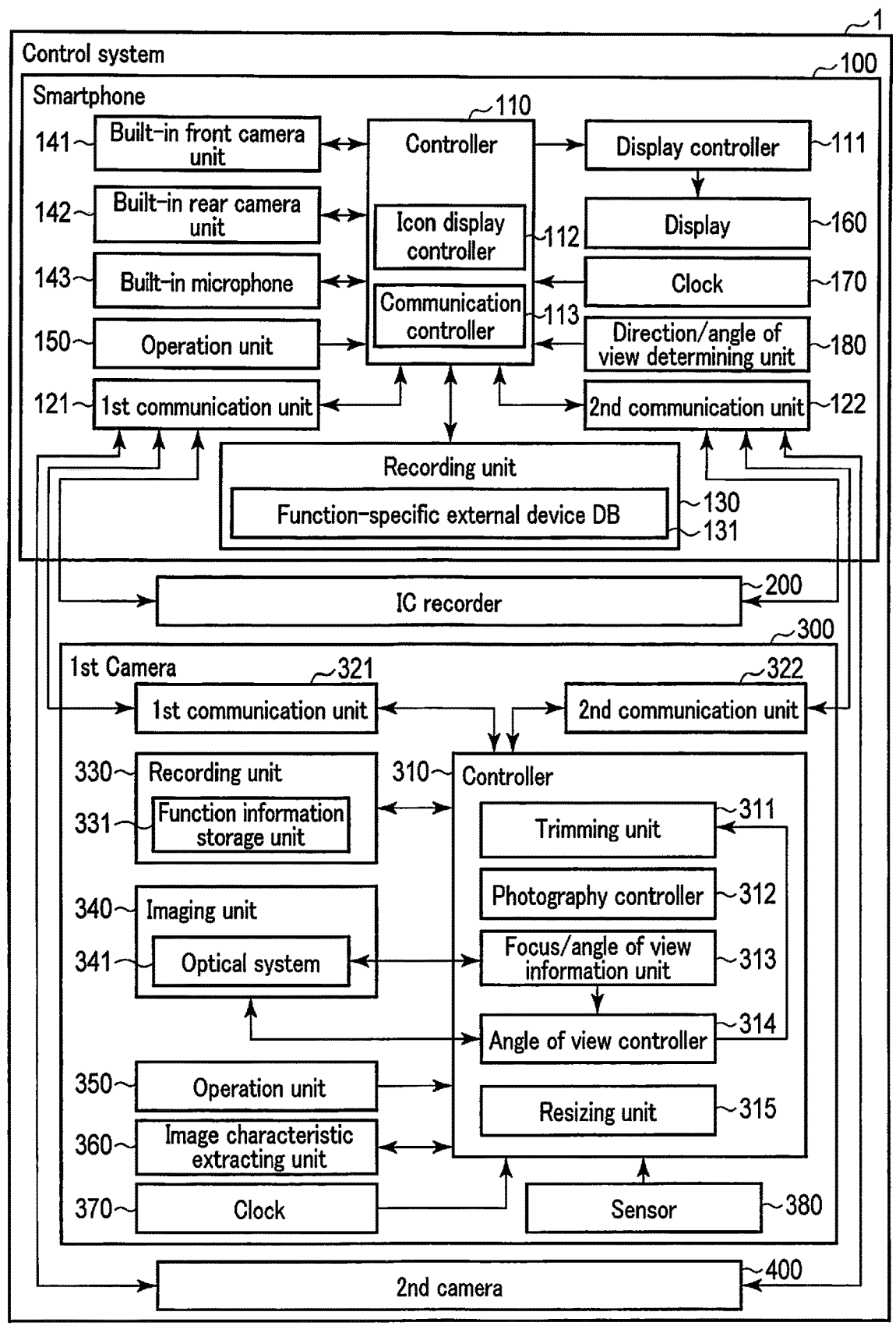
F I G. 3

| Device Name | Type | Specific External Function | Characteristic 1 | Characteristic 2 | Icon |
|---|---|---|---|---|---|
| First Device | IC recorder | Audio recording function | Linear PCM | Noise cancelation | I1 |
| Second Device | Camera | Photography function | Telephoto | Stationarily mountable | I2 |
| Third Device | Camera | Photography function | Wide angle | Flight capable | I3 |

F I G. 4

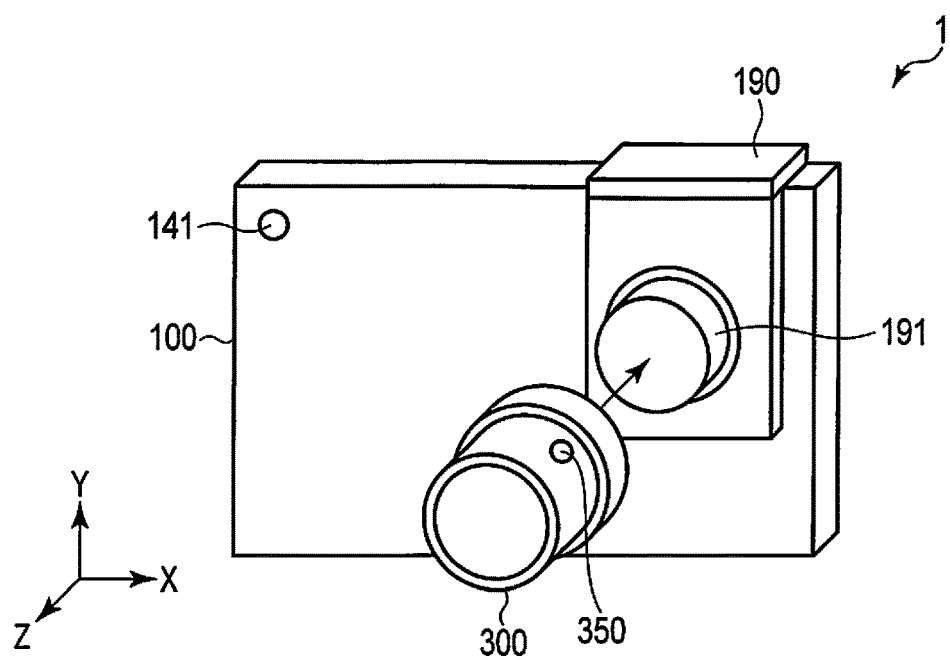
F I G. 5
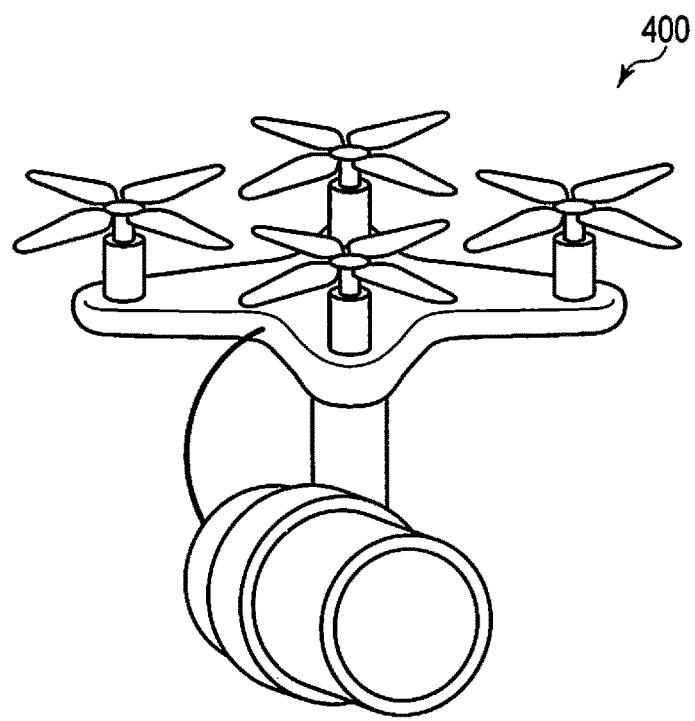
F I G. 6

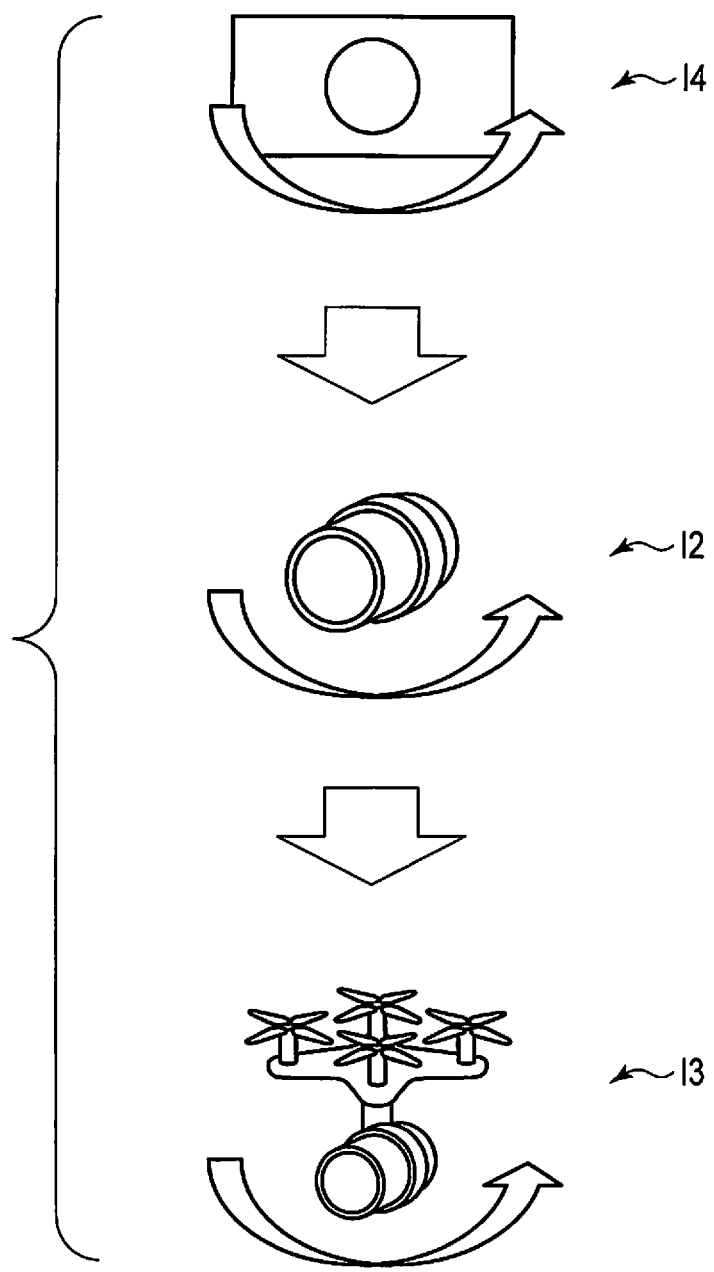
F I G. 7C

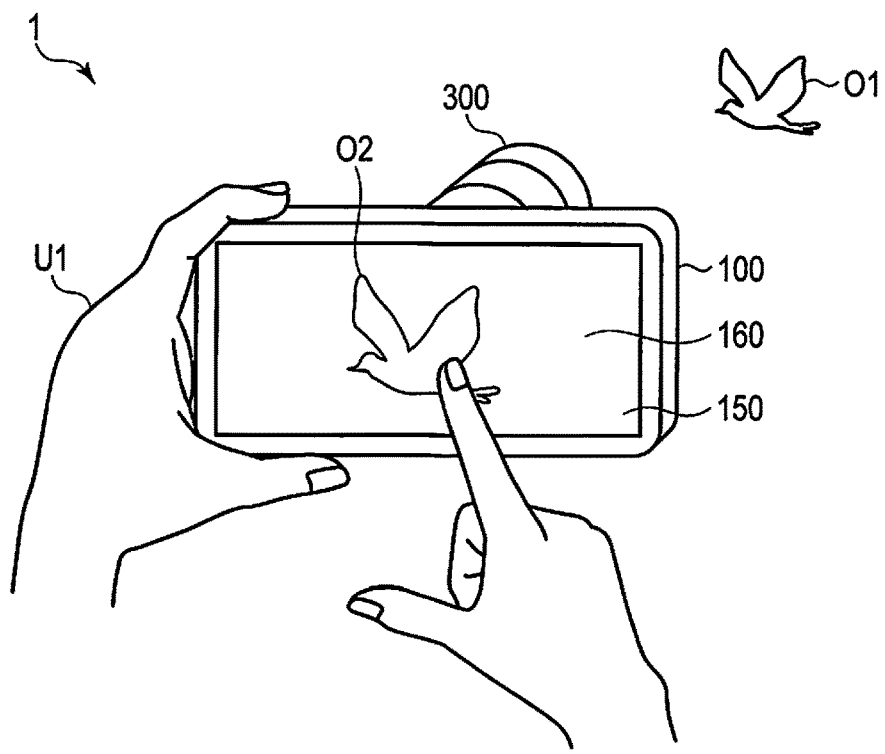
F I G. 7F
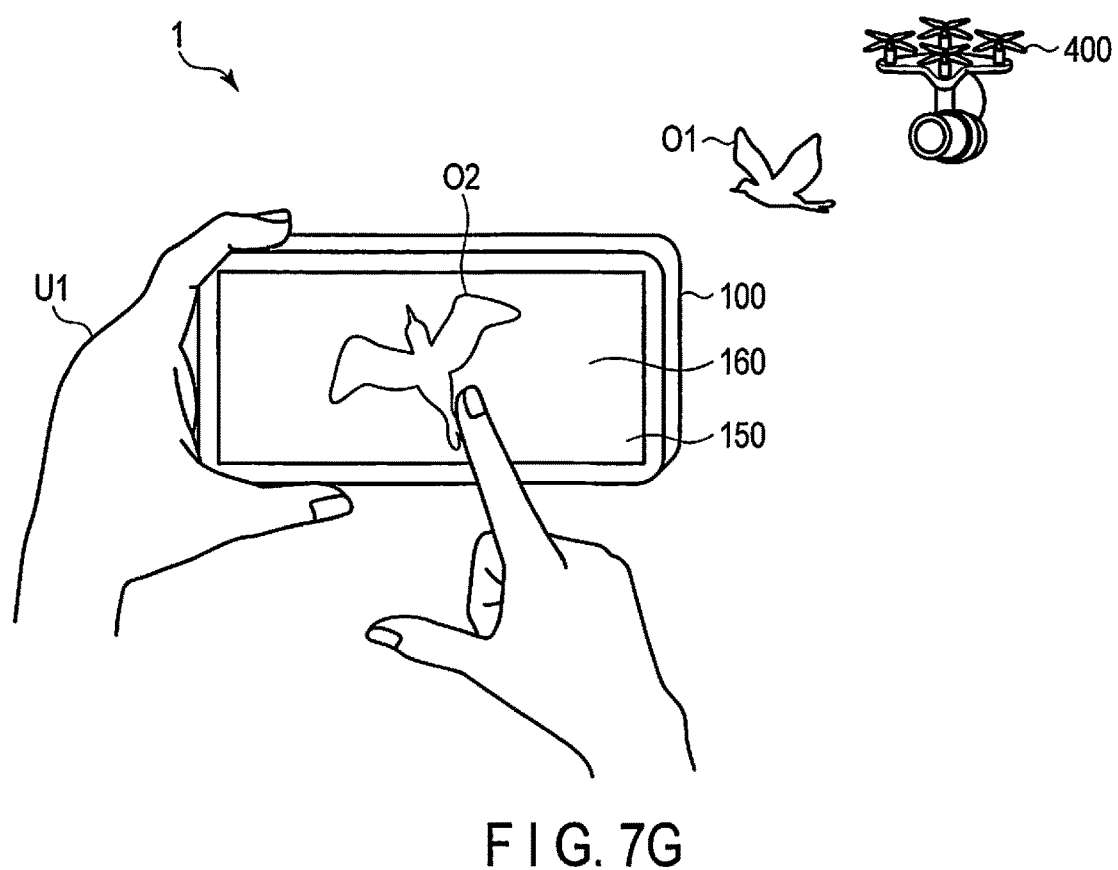
F I G. 7G

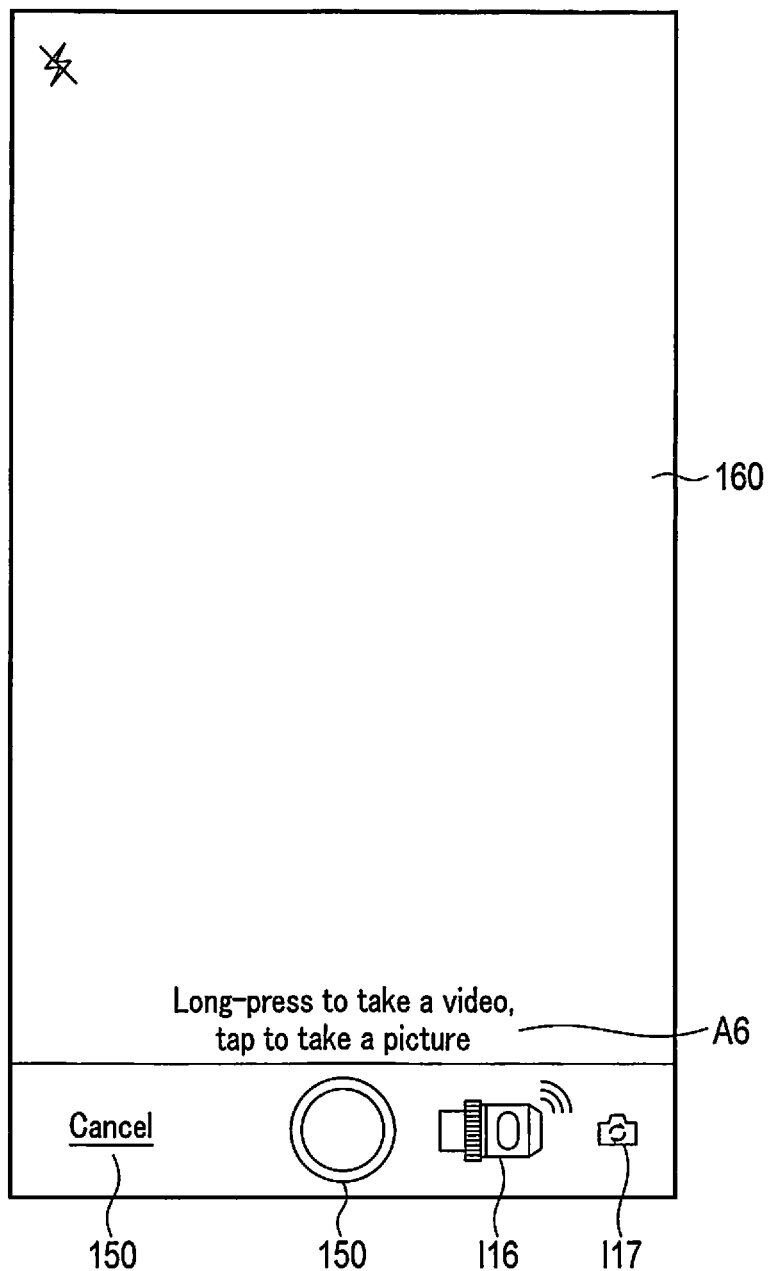
F I G. 10D

CONTROL APPARATUS, CONTROL SYSTEM, AND METHOD FOR CONTROLLING CONTROL APPARATUS

CROSS-REFERENCE TO RELATED APPLICATIONS

This application is based upon and claiming the benefit of priority from prior Japanese Patent Application No. 2016-181393, filed Sep. 16, 2016, the entire contents of which are incorporated herein by reference.

BACKGROUND OF THE INVENTION

1. Field of the Invention

The present invention relates to a control apparatus, a control system, and a method for controlling a control apparatus.

2. Description of the Related Art

Information communication technologies (ICT) have recently been utilized in various fields. Attention has been given to an electronic device having a communication function and an aspect of being connected to a network, such as the Internet, or to a system including such an electronic device, in other words, a network device, such as an Internet of Things (IoT) device. For example, Jpn. Pat. Appln. KOKAI Publication No. 2009-267666 discloses a technology of determining whether or not a wireless communication device that a user wants to use is on the user's car.

Thus, there is a demand for searching a network for a network device that a user wants to use, or for a network device having a function that a user wants to use. A user may sometimes not know whether they carry other network devices or not.

BRIEF SUMMARY OF THE INVENTION

According to an aspect of the invention, a control apparatus has one or more built-in functions that are selectively usable. The control apparatus includes a plurality of communication units including a first communication unit and a second communication unit, a built-in function unit configured to execute the built-in function, and at least one control circuit. The control circuit determines which of the built-in functions is selected, determines whether there is an external device which has an external function related to the selected built-in function based on a first communication conducted by the first communication unit, controls an icon display to present to a user that the selected built-in function is also executable by the external device in addition to the built-in function unit when it is determined that there is the external device, and causes the second communication unit to communicate with the external device through a second communication to execute the external function when the external device is selected in accordance with the icon display.

According to an aspect of the invention, a control system includes the control apparatus and the one or more external devices.

According to an aspect of the invention, a method for controlling a control apparatus that has one or more built-in functions that are selectively usable is provided. The method includes conducting a plurality of communications including a first communication and a second communication, executing the built-in function, determining which of the built-in functions is selected, determining whether there is an external device which has an external function related to the selected built-in function based on the first communication, controlling an icon display to present to a user that the selected built-in function is also executable by the external device in addition to the built-in function unit when it is determined that there is the external device, and communicating with the external device through the second communication to execute the external function when the external device is selected in accordance with the icon display.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing an outline of the configuration example of a control system according to a second embodiment.

FIG. 4 is a diagram showing an example of the configuration of a function-specific external device database (DB) according to the second embodiment.

FIG. 5 is a schematic diagram showing an example of the configuration of a control system including a smartphone and a specific external device according to the second embodiment.

FIG. 6 is a schematic diagram showing an example of the configuration of a specific external device according to the second embodiment.

FIG. 7C is a schematic diagram showing an example of an icon display according to the second embodiment.

FIG. 7F is a schematic diagram showing a usage situation when the specific external device is a lens-type camera according to the second embodiment.

FIG. 7G is a schematic diagram showing a usage situation when the specific external device is a camera attached to an unmanned aircraft according to the second embodiment.

FIG. 10D is a schematic diagram showing an example of an icon display when a specific external device is connected thereto and used.

DETAILED DESCRIPTION OF THE INVENTION

[First Embodiment]
<Configuration of Control System>

Figure 1:
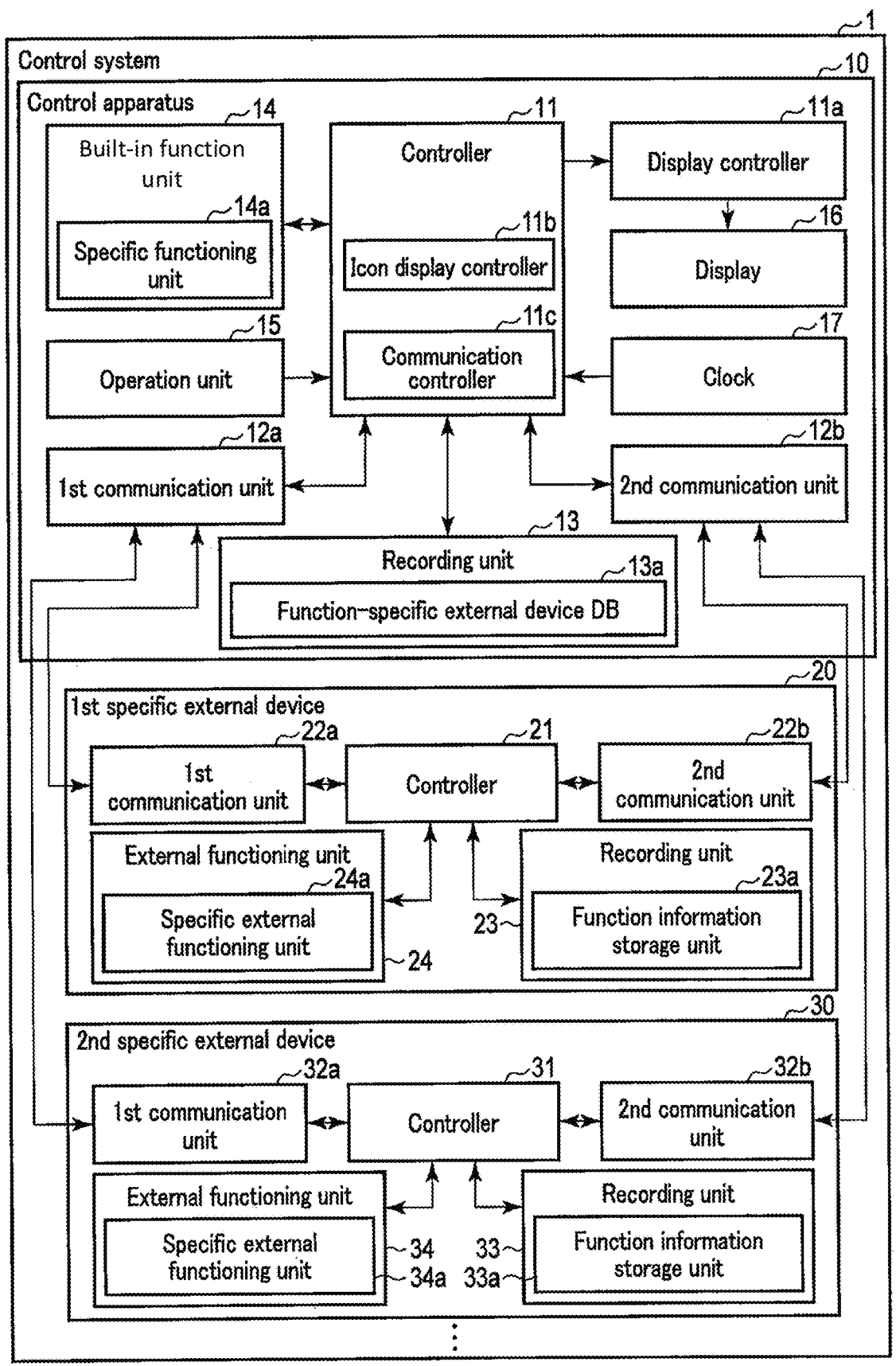
FIG. 1 is a block diagram showing an outline of the configuration example of a control system according to a first embodiment.

The first embodiment of the present invention will be described. The outline of the configuration example of the control system 1 according to the first embodiment is shown in FIG. 1 as a block diagram, and the configuration of the control system 1 according to the present embodiment will be described with reference to FIG. 1. The control system 1 according to the present embodiment includes a control apparatus 10 and one or more external devices. The control apparatus 10 is an electronic device having one or more built-in functions and a communication function, and it may be, for example, a smartphone, a tablet PC, a digital camera, or other electronic devices. In the present embodiment, the control apparatus 10 and the external device communicate with each other, and this communication may be a wired or wireless communication, or may be conducted via a communication network, such as the Internet. Accordingly, the external device according to the present embodiment may be included in an Internet of Things (IoT) device. In the following, a case where the control apparatus 10 according to the present embodiment has a plurality of built-in functions and conducts a communication with an external device wirelessly, but not through the Internet, will be described as an example.

The control apparatus 10 includes a controller 11, a display controller 11a, a first communication unit 12a, a second communication unit 12b, a recording unit 13, a built-in function unit 14, an operation unit 15, a display 16, and a clock 17.

The controller 11 controls the operation of each component in the control apparatus 10. The display controller 11a generates display information based on, for example, information obtained by the control apparatus 10, and outputs the display information to the later-described display 16. The display controller 11a may handle image processing related to displaying an image, for example, resizing. The controller 11 includes the icon display controller 11b and the communication controller 11c. The icon display controller 11b obtains, for example, information related to icons, and generates display information for displaying icons, and outputs the information to the display 16. The communication controller 11c controls, for example, the switching between a later-described first communication and second communication. The display controller 11a may be included in the controller 11, and the icon display controller 11b or the communication controller 11c is not necessarily included in the controller 11.

The control apparatus 10 includes a communication unit including a first communication unit 12a and a second communication unit 12b. The first communication unit 12a of the control apparatus 10 conducts communication with, for example, an external device, using a less-power consuming communication standard, such as Bluetooth Low Energy (BLE), Near Field Communication (NFC), ZigBee, etc. In the following, a communication conducted via the first communication unit 12a of the control apparatus 10 will be referred to as a first communication. The second communication unit 12b of the control apparatus 10 conducts a communication with, for example, an external device, using a fast communication standard or a communication standard with a large data transfer capacity, compared to a first communication which uses Wi-Fi, for example. In the following, a communication conducted via the second communication unit 12b of the control apparatus 10 will be referred to as a second communication.

In the recording unit 13, various settings and information related to the operation of the control apparatus 10 and information obtained from an external device are recorded. The built-in function unit 14 executes a built-in function of the control apparatus 10. For example, a smartphone as the control apparatus 10 includes functions of, for example, photography, audio recording, displaying, sound output, telephone, email, etc., as the built-in functions. For example, the built-in function unit 14 includes the photography function unit that executes a photography function. The photography function unit includes, for example, an optical system, an image sensor, a control circuit, etc. The operation unit 15 obtains a result of user's operation as an input, and outputs the obtained result to the controller 11 as an operation signal. The operation unit 15 includes, for example, a press button, a knob, and a touch panel. The display 16 includes, for example, a liquid crystal display to carry out displaying based on display information generated by the display controller 11a. The clock 17 generates time information and outputs it to the controller 11. The time information is used when obtained data is recorded, for example.

The external devices in the control system 1 according to the present embodiment include, for example, a first specific external device 20. The external device according to the present embodiment includes, for example, a camera, an IC recorder, a TV, a PC display, a speaker, a PC, a smartphone, and other electronic devices. If the control apparatus 10 is a camera, for example, an interchangeable lens, a strobe light, etc. may be included as the external devices.

The first specific external device 20 has a controller 21, a recording unit 23, and an external function unit 24. The controller 21 performs control related to an operation at each component of the first specific external device 20. In the recording unit 23, for example, information obtained when executing the external functions included in the external function unit 24 and information related to an operation of each component of the first specific external device 20 are recorded. The external function unit 24 executes an external function of the first specific external device 20. For example, a camera as the first specific external device 20 includes functions of photography and audio recording, etc. as the external functions. For example, an IC recorder as the first specific external device 20 includes the function of audio recording, etc. as an external function.

The first specific external device 20 further has a first communication unit 22a and a second communication unit 22b. The first communication unit 22a conducts a first communication with the first communication unit 12a of the control apparatus 10. The first communication includes transmitting and receiving control signals between, for example, the control apparatus 10 and an external device. The second communication unit 22b of the first specific external device 20 conducts a second communication with the second communication unit 12b of the control apparatus 10. The second communication includes transmitting and receiving between, for example, the control apparatus 10 and the external device data obtained by an external device.

If any of the plurality of built-in functions of the control apparatus 10 has an external device having an external function related or similar to the built-in function, it is called a specific function. The built-in function unit 14 of the control apparatus 10 has a specific function unit 14a that executes a specific function. A function of an external device related to or similar to any specific function of the control apparatus 10 is called a specific external function, and an external device having the specific external function is called a specific external device. The external function unit 24 of the first specific external device 20 includes a specific external function unit 24a that executes a specific external function.

A function-specific external device database (DB) 13a is provided in the recording unit 13 of the control apparatus 10. In the function-specific external device DB 13a, correspondence between, for example, the specific functions of the control apparatus 10 and the specific external functions of the first specific external device 20 is recorded. The information recorded in the function-specific external device DB 13a may be registered in advance of the recording of the information, or may be obtained before the recording if the information related to a specific external device is not recorded in the function-specific external device DB 13a, for example, when the specific external device is connected to the control apparatus 10 for the first time.

The recording unit 23 of the first specific external device 20 includes a function information storage unit 23a. In the function information storage unit 23a, the information related to a specific external function of the first specific external device 20 is recorded. Such information recorded in the function information storage unit 23a includes, for example, performance of a specific external function, and is used for an auxiliary display for presenting, to a user, information assumed when the specific external function is used. The function information is not necessarily information of "a function" despite its name; it may be information specifying a product itself, such as a product name and a product model number, that can be a clue when searching for "a function", or may be related information, such as a field of product, an abbreviated name of a product, or setting information set by a user. The technology according to the present embodiment may be able to externally search for or to construe "a function" of a device through a communication with the outside of the control system 1 based on such device-identifying information. The technology according to the present embodiment may be able to infer from usage history devices that are frequently used by a user in a situation and present such devices to the user. In this case, such related information and function information may be stored in an external storage, or in a temporary storage for recording in conjunction with results of an external search and determination, or a recording unit may partially exist in the outside of the control system 1.

The specific external device according to the present embodiment may be an electronic device comprising at least a component corresponding to the specific external function unit 24a and a communication unit, and it may be one or more. The control system 1 according to the present embodiment further includes, for example, a second specific external device 30. The second specific external device 30 has a controller 31, a recording unit 33, an external function unit 34, a first communication unit 32a, and a second communication unit 32b. The recording unit 33 has a function information storage unit 33a. The external function unit 34 has a specific external function unit 34a. The components of the second specific external device 30 are similar to those of the first specific external device 20, and the controller 31 corresponds to the controller 21, the recording unit 33 corresponds to the recording unit 23, the function information storage unit 33a corresponds to the function information storage unit 23a, the external function unit 34 corresponds to the external function unit 24, the first communication unit 32a corresponds to the first communication unit 22a, and the second communication unit 32b corresponds to the second communication unit 22b. In the following, a case where the control system 1 according to the present embodiment has these two specific external devices will be explained.

Each of the recording unit 13 of the control apparatus 10, the recording unit 23 of the first specific external device 20, and the recording unit 33 of the second specific external device 30 is a non-volatile memory, such as a flash memory, and they may further have a volatile memory, such as a static random access memory (SRAM) and a dynamic random access memory (DRAM). Each of the recording unit 13 of the control apparatus 10, the recording unit 23 of the first specific external device 20, and the recording unit 33 of the second specific external device 30 may consist of one memory, or a combination of a plurality of memories. Two or more elements in the recording unit 13 of the control apparatus 10, the recording unit 23 of the first specific external device 20, or the recording unit 33 of the second specific external device 30 may consist of one memory. An external database of the control system 1 may of course be used as a part of the memory.

Each of the controller 11 and the display controller 11a of the control apparatus 10, the controller 21 of the first specific external device 20, the controller 31 of the second specific external device 30, and any elements therein includes an integrated circuit, such as a central processing unit (CPU), application specific integrated circuit (ASIC), a field programmable gate array (FPGA), a digital signal processor (DSP), or a graphics processing unit (GPU). Each of the controller 11 of the control apparatus 10, the display controller 11a, the controller 21 of the first specific external device 20, the controller 31 of the second specific external device 30 may consist of one integrated circuit, or a combination of a plurality of integrated circuits. Two or more elements of the controller 11 of the control apparatus 10, the display controller 11a, and two or more elements in the controller 21 of the first specific external device 20, or two or more elements in the controller 31 of the second specific external device 30 may consist of one integrated circuit. The operations of these integrated circuits are executed, for example, in accordance with programs recorded in a recording region provided in, for example, the recording unit 13 of the control apparatus 10, the recording unit 23 of the first specific external device 20, the recording unit 33 of the second specific external device 30, or an integrated circuit.

<Operation of Control System>

An example of the control apparatus control processing according to the first embodiment is illustrated as a flowchart in FIG. 2, and the operation of the control system 1 according to the present embodiment will be explained with reference to the flowchart. Herein, suppose the external device is in a stand-by state for a first communication.

In step S101, the controller 11 causes the display 16 to display a list of icons respectively related to the built-in functions of the control apparatus 10, i.e., function-specific icons. The processing in this step is performed when the power of the control apparatus 10 is turned on, or when a sleep state is canceled, for example.

In step S102, the controller 11 determines whether an icon indicating a specific function among a plurality of built-in functions is selected or not based on an output from the operation unit 15 in accordance with a user's operation. The processing in this step is executed when a user selects any of the function-specific icons in step S101, for example. The controller 11 determines whether the selected function is a specific function or not, referring to, for example, the recording unit 13. The processing proceeds to step S110 when it is determined that a built-in function other than a specific function is selected, and proceeds to step S103 when it is determined that a specific function is selected.

In step S103, the controller 11 searches for a specific external device through a first communication. In this step, the controller 11 specifies a specific external device corresponding to the selected specific function, referring to the function-specific external device DB 13a. The controller 11 causes the first communication unit 12a of the control apparatus 10 to conduct a first communication with the specified specific external device. The information recorded in the function-specific external device DB 13a is not necessarily information classified by "functions"; it may be information in which a product itself is recorded, such as a product name and a product model number that can be a clue when referring to or searching for "a function". The information recorded in the function-specific external device DB 13a may be information that allows analyzing each piece of related information to determine whether a function is included, such as a product field, an abbreviated name, and setting information set by a user. Such accessible information, and related information identifying a device may be obtained when a device is selected. Furthermore, the control system 1 may be configured to be able to externally search for, or to construe "a function" of the device through a communication with the outside of the control system 1. In other words, the function-specific external device DB 13a may be provided outside of the control system 1. On the other hand, the control system 1 may internally have a memory for temporarily recording a result of the search and determination. The function is not necessarily a similar function; for example, a search for an audio recording function is conducted so that a digital camera, a video camera, and a smartphone, which have an audio recording function, may be searched for.

In step S104, the controller 11 determines whether or not a specific external device corresponding to the selected specific function is currently present in the vicinity of the control apparatus 10 based on a result of a first communication. The processing proceeds to step S105 when it is determined that a specific external device is present, and proceeds to step S110 when it is determined that no specific external device is present. Herein, for example, Bluetooth Low Energy (BLE), which consumes less power and can be constantly set as communication enabled (a stand-by mode, etc.), may be used for a wireless communication. A BLE communication is mainly a command communication, and such a communication period of a command communication is transitory; thus, it is possible to switch a communication network from one to another, and to conduct a sequential search for a communication partner if a BLE communication is utilized.

In step S105, the controller 11 obtains information from the specific external device through a first communication. Information obtained by the controller 11 from the specific external device in this step includes information related to an icon indicating the specific external device and performance, or characteristics of the specific external function. The obtained information is recorded in the function-specific external device DB 13a. The controller 11 causes the display 16 to display an icon of the selected specific function. The icon displayed herein includes an icon indicating the specific function unit 14a and an icon indicating the specific external device obtained in this step. By displaying icons in such a manner, the control apparatus 10 according to the present embodiment can cooperate with external devices intuitively and freely, with a feeling similar to the feeling at the time of selecting a built-in function. If a user uses the control apparatus 10 according to the present embodiment, a user can visually and immediately remember the devices they put in a bag or a desk drawer, and can operate such devices promptly. This operation allows a user to expand a photography region and to select an optimum function if a selected function is a camera photography function. If the information obtained from a specific external device is an icon, an amount of information is small, and with the technology according to the present embodiment, it is possible to increase a communication speed and to easily conduct a communication even with a small communication capacity.

In step S106, the controller 11 determines whether an icon indicating a specific external device among the displayed icons is selected or not based on an output from the operation unit 15 in accordance with, for example, a user's operation. The processing proceeds to step S107 when it is determined that an icon indicating a specific external device is selected, and proceeds to step S111 when it is determined that the icon is not selected. A case of selecting one icon is explained herein; however, for the purpose of performing photography in cooperation with a plurality of cameras, selecting a plurality of icons may be possible. In addition, the control apparatus 10 may display, for example, characteristics stored in the function-specific external device DB 13a along with the icons. With the aforementioned options, a user can easily select other related devices that they can use through the icon operation as an extension of a user interface established on a PC or a smartphone, without any special additional operation.

In other words, with such a configuration, the controller 11 determines which built-in function is selected among the built-in functions of the control apparatus 10. The controller 11 further determines, through a communication conducted by the first communication unit 12a, whether there is any external device that executes an external function related to or similar to the selected built-in function. For example, the icon display controller 11b of the controller 11 presents a result of the determination to a user by an icon display. Thus, the technology according to the present embodiment can provide the control apparatus 10, the control system 1, and the control method that can seamlessly cooperate with the above external device through the second communication unit 12b, when the external device is selected in accordance with the icon display. Switching between the communications is carried out by, for example, the communication controller 11c of the controller 11.

In step S107, the controller 11 activates the specific external device indicated by the selected icon. In this step, the controller 11 generates a control signal to activate the specific external device, and causes the first communication unit 12a of the control apparatus 10 to transmit the signal to the specific external device through a first communication. When the specific external device receives the control signal, the device turns the power on or cancels a sleep mode to start its operation.

In step S108, the controller 11 causes the second communication unit 12b of the control apparatus 10 to establish a second communication with the specified specific external device. After that, the controller 11 controls the operation of the specific external device by the first communication or the second communication, and obtains the data obtained by the specific external device through the second communication. In other words, a user can start using the specific external device. In step S109, the controller 11 determines whether or not the specific external function should be finished. The determination may be made based on, for example, an output from the operation unit 15 in accordance with a user's operation, or based on whether a communication with the specific external device is continued or not. If it is determined that the specific external function should not be finished, the processing continues the processing related to the specific external function until it is determined that the specific external function should be finished in step S109; if it is determined that the specific external function should be finished, the processing returns to step S101.

When a built-in function other than a specific function is selected in step S102, or when no specific external devices are found in the step S104, in step S110, the controller 11 causes the display 16 to display an icon indicating the built-in function unit 14. Afterwards, the processing proceeds to step S111.

If the icon indicating the specific external device is not selected after step S110 or in step S106, in step S111, the controller 11 determines whether or not the displayed icon indicating the built-in function unit 14 of the control apparatus 10 is selected based on, for example, an output from the operation unit 15 in accordance with a user's operation. In step S111, the controller 11 determines whether or not there is only one choice for the built-in function unit 14 of the control apparatus 10. The processing proceeds to step S113 when it is determined that an icon indicating the built-in function unit 14 is selected or there is one choice, and proceeds to step S112 when it is determined that the icon is not selected.

In step S112, the controller 11 determines whether the processing returns or not to a step of displaying a list of function-specific icons. In this step, it is determined that the processing returns if, for example, the operation unit 15 detects a user's operation of returning or finishing in step S111, or if the operation unit 15 does not detect a user's operation for a predetermined time. The processing returns to step S101 when it is determined that the processing returns, and returns to step S111 when it is not determined that the processing returns.

In step S113, the controller 11 starts the operation of the built-in function unit 14 indicated by the selected icon. In step S114, the controller 11 determines whether the operation of the built-in function unit 14 is finished or not based on, for example, an output of the operation unit 15 in accordance with a user's operation. If it is determined that the operation is not finished, the processing continues the processing related to the selected built-in function until it is determined that the processing is finished in step S114; if it is determined that the operation is finished, the processing returns to step S101.

In the present embodiment, a case where one specific external device has one specific external function is explained but the embodiment is not limited thereto. For example, the specific external function unit may include a plurality of specific external function modules that execute a specific external function respectively corresponding to a plurality of specific functions. In this case, for example, a specific external function module may be searched instead of the specific external device in step S103, or an icon indicating a specific external function module may be displayed in step S105.

In the above description, the controller 11 according to the present embodiment causes the display 16 to display a list of icons; however, the embodiment is not limited thereto. What is displayed on the display 16 by the controller 11 may be various functions of the control apparatus 10, or a specific external device and information that specifies the control apparatus 10 or a specific external device, or may be texts. An email function may be displayed with an image representing the function, not a mechanical element of the function. In the above description, the controller 11 according to the present embodiment obtains performance or characteristics of a specific external function, and information of an icon indicating a specific external device is obtained through a first communication; however, this information may be recorded in the function-specific external device DB 13a, etc. in advance.

In the above description, the controller 11 causes the display 16 to display an icon indicating the built-in function unit 14 if no specific external device is found; however, the embodiment is not limited thereto. If, for example, correspondence between a specific function and a specific external device is recorded in advance in the function-specific external device DB 13a, the controller 11 carries out a presentation even when a specific external device is not found through a communication to prompt a user to prepare the specific external device.

In the present embodiment, specific external devices corresponding to specific functions are recorded in advance in the function-specific external device DB 13a according to the present embodiment; however, the embodiment is not limited thereto. For example, when a built-in function of the control apparatus 10 is selected, the controller 11 may search for and determine, through a first communication, whether or not there is a specific external device that can execute a function related to or similar to the selected built-in function.

Figure 2:
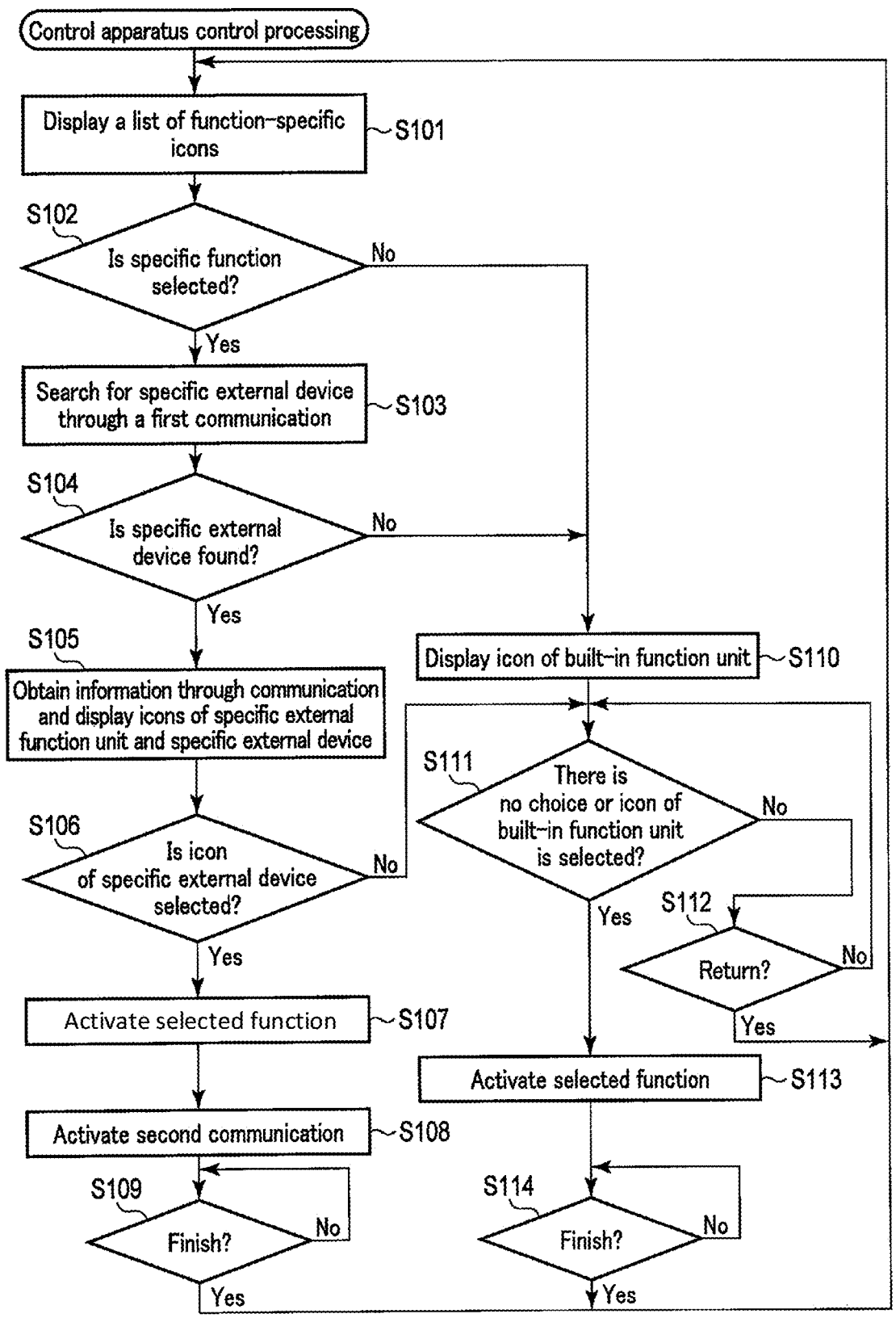
FIG. 2 is a flowchart showing an example of a control apparatus control processing according to the first embodiment.

In step S105 of the control process control processing indicated as a flowchart in FIG. 2, for example, the controller 11 may display information assumed when a specific external device is used as an auxiliary display based on the obtained performance and characteristics of the specific external function. An auxiliary display includes, if a specific external function is a photography function, a display of information related to setting of an external device, such as an angle of view, a focal distance, and sensitivity, etc., which are assumed to be obtained when a specific external device is used. An auxiliary display may be images, graphics, and text. An auxiliary display may be information which visualizes the function, or may display an effect of the function, such as an effect of a telephoto lens.

The controller 11 may control the specific function unit 14a and a specific external device at the same time. For example, when the video shooting function is selected, videography may be performed by the specific function unit 14a, and the controller 11 may obtain audio data by an IC recorder included in the specific external device. The data may be successively obtained by the specific external device through a second communication, or may be synthesized with, for example, an output from the clock 17 which is sent in advance through a first communication. If the data is obtained so as to be synthesized afterwards, the data may be obtained through a second communication after the specific external device is used, or may be obtained through an external recording medium.

As described above, when a user selects a built-in function of the control apparatus 10, the control system 1 according to the present embodiment searches for a specific external device which can execute a function related to the built-in function. When the specific external device is detected herein, it is possible to concurrently present or recommend to a user the specific function unit 14*a* that can execute the built-in function and the specific external device. Thus, only by selecting a built-in function, a user can select, without being aware, the specific function unit 14*a* and the specific external device that are capable of executing a similar, related, and linked function.

If information that is assumed when the control system 1 according to the present embodiment uses a specific external device is displayed as an auxiliary display, a user can easily determine whether or not the presented specific external device should be used.

[Second Embodiment]

The second embodiment of the present invention is described. Herein, differences from the first embodiment will be described, and elements specified by the same reference characters carry out the same operations, and a duplicate description of such elements will be omitted.

<Configuration of Control System>

The outline of the configuration example of the control system 1 according to the second embodiment is shown in FIG. 3 as a block diagram, and the configuration of the control system 1 according to the present embodiment will be described with reference to FIG. 3. Hereinafter, the configuration and operation of the control system 1 will be explained more specifically using an example when the control system 1 includes, for example, a smartphone 100 as a control apparatus 10 and specific external devices. The specific external devices include an IC recorder 200, a first camera 300 as a lens-type camera, and a second camera 400 as an unmanned aircraft that is capable of aerial photography. Accordingly, the specific function of the smartphone 100 according to the present embodiment includes, for example, an audio recording function and a photography function.

The smartphone 100 includes a controller 110, a display controller 111, a first communication unit 121, a second communication unit 122, a recording unit 130, a built-in front camera unit 141, a built-in rear camera unit 142, a built-in microphone 143, an operation unit 150, a display 160, a clock 170, and a direction/angle of view determining unit 180. The controller 110 includes the icon display controller 112 and the communication controller 113. If compared with the configuration of the control apparatus 10 according to the first embodiment, the controller 110 corresponds to the controller 11, the display controller 111 corresponds to the display controller 11*a*, the icon display controller 112 corresponds to the icon display controller 11*b*, the communication controller 113 corresponds to the communication controller 11*c*, the first communication unit 121 corresponds to the first communication unit 12*a* of the control apparatus 10, the second communication unit 122 corresponds to the second communication unit 12*b* of the control apparatus 10, the recording unit 130 corresponds to the recording unit 13, the operation unit 150 corresponds to the operation unit 15, the display 160 corresponds to the display 16, and the clock 170 corresponds to the clock 17.

A function-specific external device DB 131 is provided in the recording unit 130. The function-specific external device DB 131 corresponds to the function-specific external device DB 13*a* of the control apparatus 10 according to the first embodiment. Herein, an example of the configuration of the function-specific external device DB 131 according to the present embodiment is shown in FIG. 4. As shown in FIG. 4, the information recorded in the function-specific external device DB 131 is information related to a specific external device having an external function similar to or related to a specific function of, for example, a smartphone 100. The information includes, for example, a device name, a device type, a specific external function, characteristics or performance of the function, and information of an icon indicating the device, etc.

For example, in the present embodiment, information of an IC recorder 200 is recorded under "First Device" as the device name, and the recorded information indicates that the specific external function of the device is a recording function, that the characteristic of the function is that a linear PCM can be selected as a recording format and is capable of noise canceling, and that the icon I1 is the one shown in FIG. 4. For example, in the present embodiment, information related to the lens-type camera as the first camera 300 is recorded under the device name "Second Device", and the information indicates that the specific external function thereof is a photography function, and the characteristic of the function enables telephotography, and the smartphone 100 can be mounted using an adapter, and that the icon I2 is the one shown in FIG. 4. For example, in the present embodiment, information related to the camera attached to an unmanned aircraft as the second camera 400 is recorded under the device name "Third Device", and the information indicates that the specific external function thereof is a photography function, and the characteristic of the function is that wide-angle photography and aerial photography are possible, and that the icon I3 is the one shown in FIG. 4. The timing of recording the information in the function-specific external device DB 131 will be described later. A device name of a specific external device may be an ID to identify the device.

In the example described herein, the icons displayed in the present embodiment are relatively simple and each icon indicates one external device; however, associated devices, for example, a camera and a strobe, a PC and a keyboard, and "a camera with a strobe", may be searched. In this case, even when a user cannot search for one device, the device can be searched if the device is associated with other devices, thereby widening the choice of devices that can be used. The icons are not necessarily pictures, and they may be texts or characters, as long as they are easy to understand. Pictures are easily and intuitively understood, regardless of languages.

The table format is not necessarily like the table shown in FIG. 4, and not all the items shown therein are always necessary. The function information is not necessarily information of "a function" despite its name; it may be information specifying a product itself, such as a product name and a product model number, that can be a clue when searching for "a function", or may be related information, such as a product field, an abbreviated name of a product, or setting information set by a user. The technology according to the present embodiment may be able to externally search for or to construe "a function" of a device through a communication with the outside of the control system 1 based on such information of ID and related information. At this time, the function-specific external device DB 131 and the function information storage unit 331 may be provided outside of the control system 1, and may temporarily record results of an external search and determination.

Functions may be replaced with usage scenes. For example, the control apparatus 10 can determine that a user wants to perform audio recording when they want to use a camera, and similar selective control is effective in this case. Furthermore, although the term "search" is used in step S103, the technology according to the present embodiment is applicable to an aspect of recommending an external device through learning of a user's usage history, and in this case, a device can be selected through a method, such as authentication, identification, and detection. Icon information may be obtained through a communication or from predetermined correspondence. In other words, the control apparatus 10 according to the present embodiment may be described as a control apparatus that is capable of determining a scene of a user's usage of a device and to switch information obtained through the above-described first communication. Herein, in the control system 1, information used for searching for an external device through a first communication may be switched in accordance with a scene and to be responded by the external device, or an external device responded through a first communication may be identified, selected and chosen, and an icon of the chosen device may be displayed.

Next, the configuration of the control system 1 according to the present embodiment is explained with reference back to FIG. 3. The built-in front camera unit 141, the built-in rear camera unit 142, and the built-in microphone 143 correspond to the specific function unit 14a of the control apparatus 10 according to the first embodiment.

Each of the built-in front camera unit 141 and the built-in rear camera unit 142 includes, for example, an image sensor and an imaging optical system, and image data is generated and output based on a subject image formed on an imaging surface of the image sensor. In the present embodiment, both of the built-in front camera unit 141 and the built-in rear camera unit 142 perform the photography function in a similar manner, but they are arranged in different locations so that different directions can be photographed. The built-in microphone 143 collects sound, and outputs audio data. Audio data includes data of all kinds of collected sound, not only a human voice. The direction/angle of view determining unit 180 determines a current range and direction of photography performed by the smartphone 100 based on images obtained by, for example, the built-in front camera unit 141 and the built-in rear camera unit 142. The direction/angle of view determining unit 180 may include sensors, such as a gyro sensor, an electronic compass, and a GPS, for example, and may determine the range and direction of photography based on outputs from these sensors. The direction/angle of the view determining unit 180 may further use an image and sensor-output values to determine the range and direction of photography.

The IC recorder 200 includes at least a specific external function unit and a communication unit for executing the audio recording function.

The first camera 300 includes a controller 310, a first communication unit 321, a second communication unit 322, a recording unit 330, an imaging unit 340, an operation unit 350, an image characteristic extracting unit 360, a clock 370, and a sensor 380. The first camera 300 includes a specific external function unit corresponding to the specific external function unit 24a of the first specific external device 20 according to the first embodiment. The specific external function unit includes, for example, the imaging unit 340 and the image characteristic extracting unit 360.

The controller 310 corresponds to the controller 21 of the first specific external device 20 according to the first embodiment. The controller 310 according to the present embodiment includes a trimming unit 311, a photography controller 312, a focus/angle of view information unit 313, an angle of view controller 314, and a resizing unit 315. The trimming unit 311 performs trimming on an image. The photography controller 312 performs, for example, various settings related to photography, and controls imaging performed by the imaging unit 340. The focus/angle of view information unit 313 obtains information of settings of a state of focus, an angle of view, etc. at the time of performing photography by the first camera 300 based on an image obtained by the imaging unit 340. The angle of view controller 314 controls an angle of view of imaging performed by the imaging unit 340 based on an output of, for example, the focus/angle of view information unit 313. The resizing unit 315 performs resizing on, for example, the image obtained by the imaging unit 340.

If compared with the configuration of the first specific external device 20 according to the first embodiment, the first communication unit 321 corresponds to the first communication unit 22a, the second communication unit 322 corresponds to the second communication unit 22b, the recording unit 330 corresponds to the recording unit 23, the function information storage unit 331 corresponds to the function information storage unit 23a, and the imaging unit 340 corresponds to the specific external function unit 24a. The recording unit 330 has the function information storage unit 331. In the function information storage unit 331, information of functions of the first camera 300, performance of the functions, and an icon indicating the device are recorded, for example. The imaging unit 340 includes an optical system 341. The imaging unit 340 further includes, for example, an image sensor, and generates and outputs image data based on a subject image formed on an imaging surface of the image sensor by incident light entered via the optical system 341.

The operation unit 350 obtains a result of a user's operation. The operation unit 350 includes, for example, a press button, a dial, a slider, and a touch panel, etc. The image characteristic extracting unit 360 detects, for example, characteristics included in an image obtained by the imaging unit 340. The image characteristics extracted herein are used for subject recognition and identification, for example. The clock 370 outputs time information. The sensor 380 includes, for example, an electronic compass, an acceleration sensor, a brightness sensor, a GPS sensor, etc., and obtains and outputs a state of a housing and the periphery of the first camera 300.

The second camera 400 includes at least a specific external function unit for executing a photography function and a communication unit.

An example of the configuration of a control system 1 including the smartphone 100 and the first camera 300 according to the second embodiment is shown in FIG. 5 as a schematic diagram. The smartphone 100 may include an adapter 190 like the one shown in FIG. 5. The first camera 300 at this time may be a camera that can be attached to the smartphone 100 with a lens attachment unit 191 of the adapter 190. An example of the configuration of the second camera 400 according to the second embodiment is shown in FIG. 6 as a schematic diagram. The second camera 400 further includes, for example, a flight unit as shown in FIG.

6, so that the camera can perform aerial photography. The flight unit may carry out autonomous flight, like a drone, or may fly in accordance with wireless maneuvering.

<Outline of Operation of Control System According to Second Embodiment>

Figure 7A:
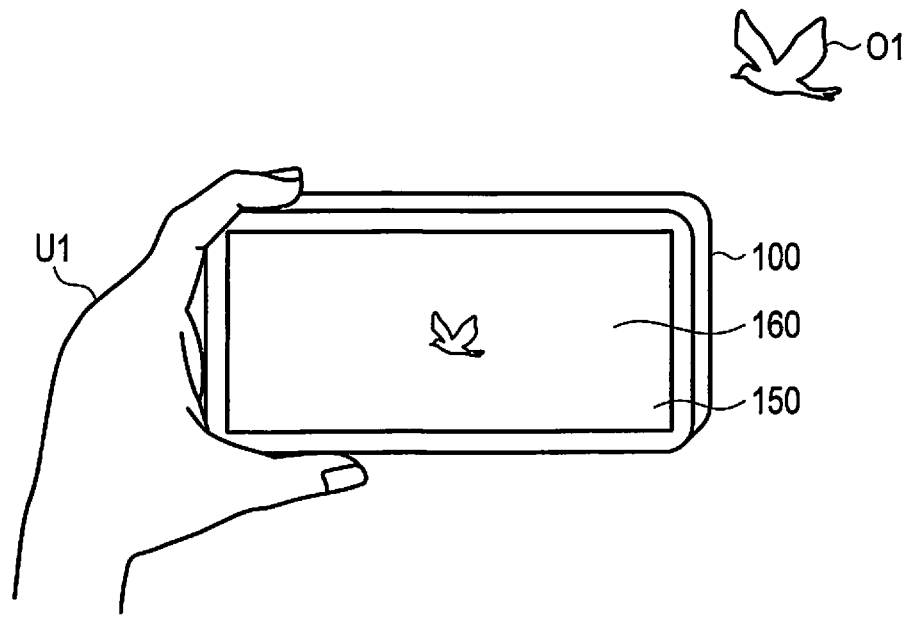
FIG. 7A is a schematic diagram showing a situation when a camera mode of the smartphone is selected according to the second embodiment.

The situation when a camera mode of the smartphone 100 according to the second embodiment is selected is shown in FIG. 7A as a schematic view, and the outline of the operation of the control system 1 according to the present embodiment will be described with reference to FIG. 7A. A camera mode is a photography function included in a specific function of the smartphone 100, and is executed by the built-in front camera unit 141 or the built-in rear camera unit 142. A user U1 takes out the smartphone 100 when, for example, they want to take a picture of a bird O1 as a subject of interest, and selects a camera mode to start photography. The user U1 selects the camera mode by operating a touch panel included in the operation unit 150 based on a function-specific icon displayed on the display 160. In this case, the smartphone 100 requests function information from the first camera 300 and the second camera 400 having a photography function as a specific external function, using a first communication.

Thus, the control apparatus 10 according to the present embodiment may obtain what a user "thinks" in advance, and determines the user and a scene of usage of a device depending on a date and time, season, location of a user, direction of a user's travel, what the user sees and observes, sounds that a user hears, or how a user uses a device or an apparatus, and makes a recommendation. In other words, the control apparatus 10 according to the present embodiment can also be described as a control apparatus that determines a scene of user's usage of a device to specify a related external function requested in the device usage scene, and switches information used for the above-described first communication to information used to search for an external device that can execute the external function. Furthermore, in the control system 1 according to the present embodiment, information used when searching for an external device through a first communication may be switched in accordance with a scene, and the searched external device may respond to the information, or the control apparatus 10 may identify, select, and choose an external device that responded in a first communication, and an icon of the chosen external device may be displayed. The control apparatus 10 according to the present embodiment switches and displays icons so as to recommend using a telephoto lens when photographing a distant subject, or using a macro lens when photographing a subject close-up. For a fast-moving subject, a camera with a fast shutter, or performance of imaging may be described in advance in the table shown in FIG. 4 or database, etc. The table may be prepared so as to be dividable based on usage scenes.

Figure 7B:
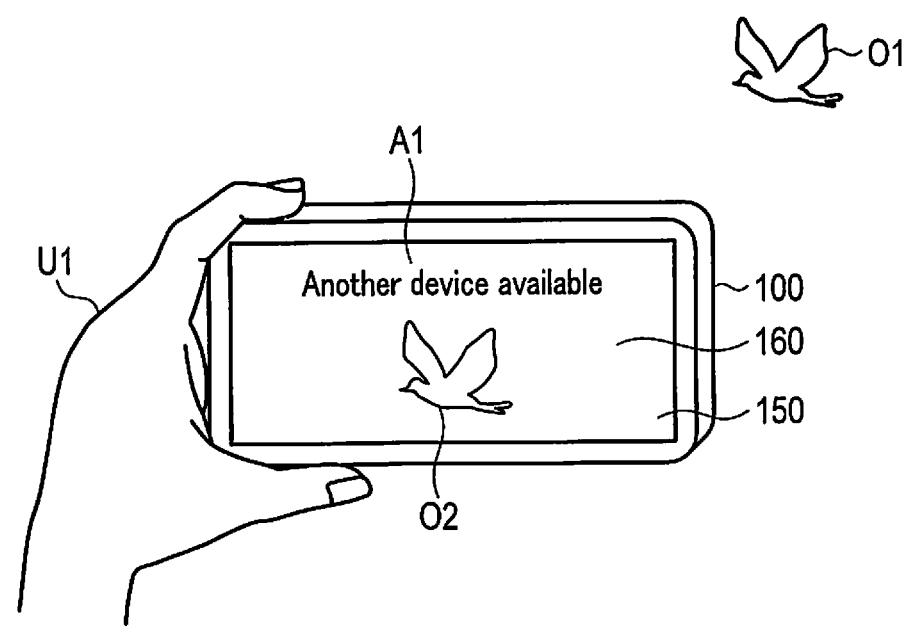
FIG. 7B is a schematic diagram showing a situation when a specific external function is presented by the smartphone according to the second embodiment.

A situation when a specific external function is presented by the smartphone 100 according to the second embodiment is shown in FIG. 7B as a schematic diagram. After the first camera 300 and the second camera 400 are detected through a first communication, and function information is obtained, the smartphone 100 displays a notification A1 indicating that a specific external device is present or ready to use on the display 160, as shown in FIG. 7B. The notification A1 may be made by displaying an icon.

Herein, an example when the notification A1 is made by displaying an icon is shown in FIG. 7C as a schematic diagram. For example, the icon I4 indicates the built-in front camera unit 141 or the built-in rear camera unit 142 of the smartphone 100. For example, the icon I2 indicates the first camera 300, and the icon I3 indicates the second camera 400. These icons may be displayed in a list, or displayed one by one in accordance with a user's operation, such as swiping. By operating or selecting the icons displayed in such a manner, a user can select a function without thinking about whether the camera mode is executed by a specific function unit of the smartphone 100 or through a communication with a specific external device. Furthermore, when a user forgets that they carry a specific external device, for example when the first camera 300 is left in their bag, or when the second camera 400 is left in their car, etc., the notification A1 of an icon, etc. can remind the user that they carry a specific external device that they can use. If an icon indicating a specific external device is selected from the displayed icons, the smartphone 100 starts a second communication with the specific external device. A communication at this time is a continuous communication carried out by the second communication unit 122, including obtaining successive data obtained by the external device. Since a second communication transmits a live-view image, a communication with a large communication capacity, for example, a Wi-Fi communication is assumed as a second communication, and a second communication occupies a line, as it requires time and effort to establish the communication and a large amount of data is successively transmitted in the communication, and the communication is not transitory information exchange, such as a simple access or response, unlike the aforementioned BLE. At this time, it is possible to search for other devices with BLE, and BLE can freely change its access partner even when the line is occupied by Wi-Fi.

Figure 7D:
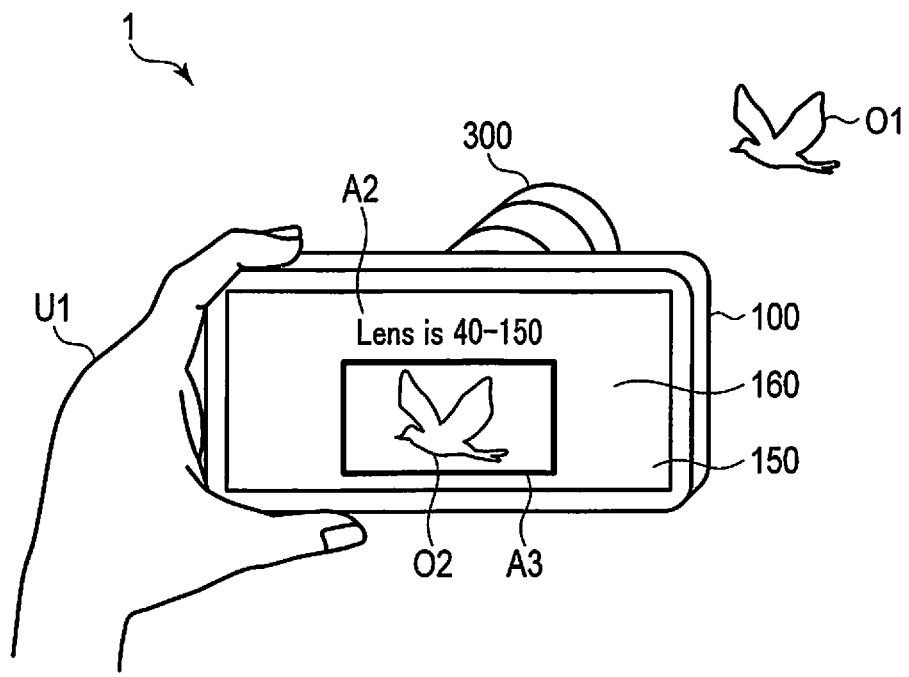
FIG. 7D is a schematic diagram showing an example of an auxiliary display in the control system according to the second embodiment.

When or before an icon indicating a specific external device is displayed as described above, the smartphone 100 may display an effect assumed when the specific external device is used in an auxiliary display. An example of an auxiliary display in the control system 1 according to the second embodiment is shown in FIG. 7D as a schematic diagram. Explained herein is an example of a case where an effect assumed when the first camera 300 is used is displayed. Suppose a live-view display is being carried out by, for example, the built-in rear camera unit 142 of the smartphone 100 after selecting a camera mode. For example, as shown in FIG. 7D, a live-view display is carried out on the display 160. At this time, the bird O1 as a subject of interest is flying far away, and the bird in the obtained live-view display is not photographed with a suitable angle of view for a bird O2 which is a subject of interest within an image. In this case, the smartphone 100 displays the specification of the lens, etc. of the first camera 300 as shown as the notification A2 based on the information obtained from the first camera 300 through a first communication, and carries out an auxiliary display to display an angle of view of an image that can be obtained when using the first camera 300 as shown as the notification A3. With such an auxiliary display, for example, the user U1 can easily determine which of the functions executed by the specific function unit including the built-in front camera unit 141 or the built-in rear camera unit 142 and the functions executed by the first camera 300 indicated by the displayed icons should be selected.

Figure 7E:
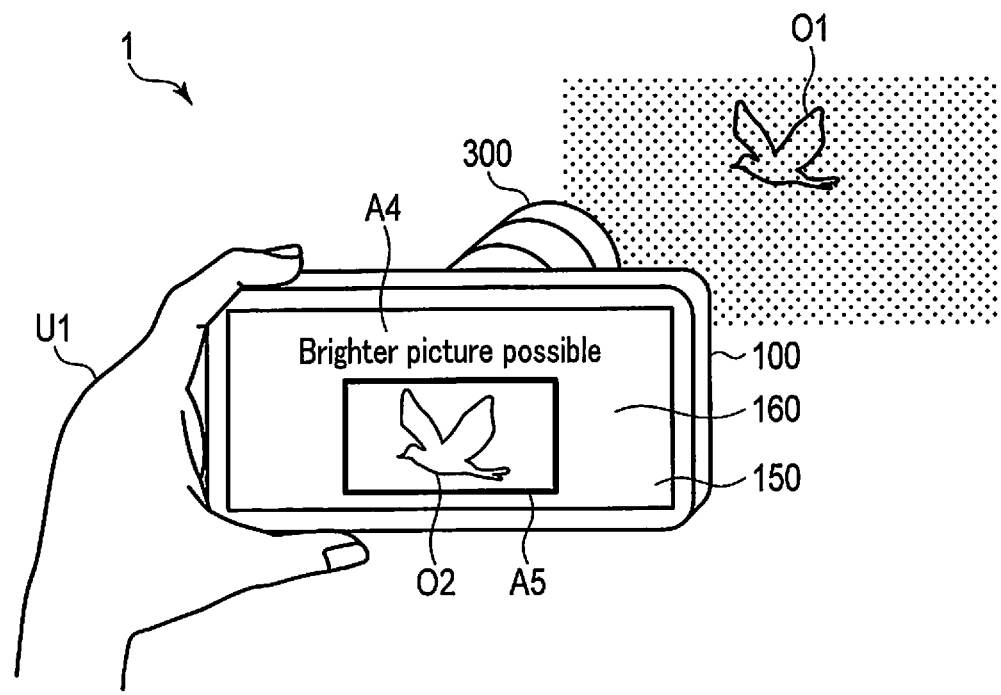
FIG. 7E is a schematic diagram showing another example of the auxiliary display in the control system according to the second embodiment.

Another example of an auxiliary display in the control system 1 according to the second embodiment is shown in FIG. 7E as a schematic diagram. For example, as shown in FIG. 7E, sensitivity of the photography performed by the specific function unit of the smartphone 100 may be insufficient, and an obtained image may be dark. The smartphone 100 displays, based on the information obtained from the first camera 300 through a first communication, an effect such as shown in the notification A4 when, for example, the first camera 300 is used, and carries out an auxiliary display such as shown in the notification A5 to display an angle of view of an image that can be obtained when using the first camera 300. Furthermore, the smartphone 100 performs image processing on an image displayed live-view based on information obtained from the first camera 300 through a first communication, and may display the image on the display 160, artificially expressing the exposure of an image that can be obtained by the first camera 300.

A usage situation where the specific external device according to the second embodiment is the first camera 300 is shown in FIG. 7F as a schematic diagram. A usage situation where the specific external device according to the second embodiment is the second camera 400 is shown in FIG. 7G as a schematic diagram. Thus, the user U1 can select and use a specific external device, such as a lens-type camera, like the first camera 300, and a camera attached to an unmanned aircraft, like the second camera 400, in a manner similar to how a specific function unit of the smartphone 100 is selected. The user U1 can obtain an image assumed in a prior auxiliary display, for example.

As described above, the smartphone 100 can present specific external devices that the user U1 can use in addition to a specific function unit, using an icon display or an auxiliary display.

<Operation of Control System According to Second Embodiment>

Figure 8A:
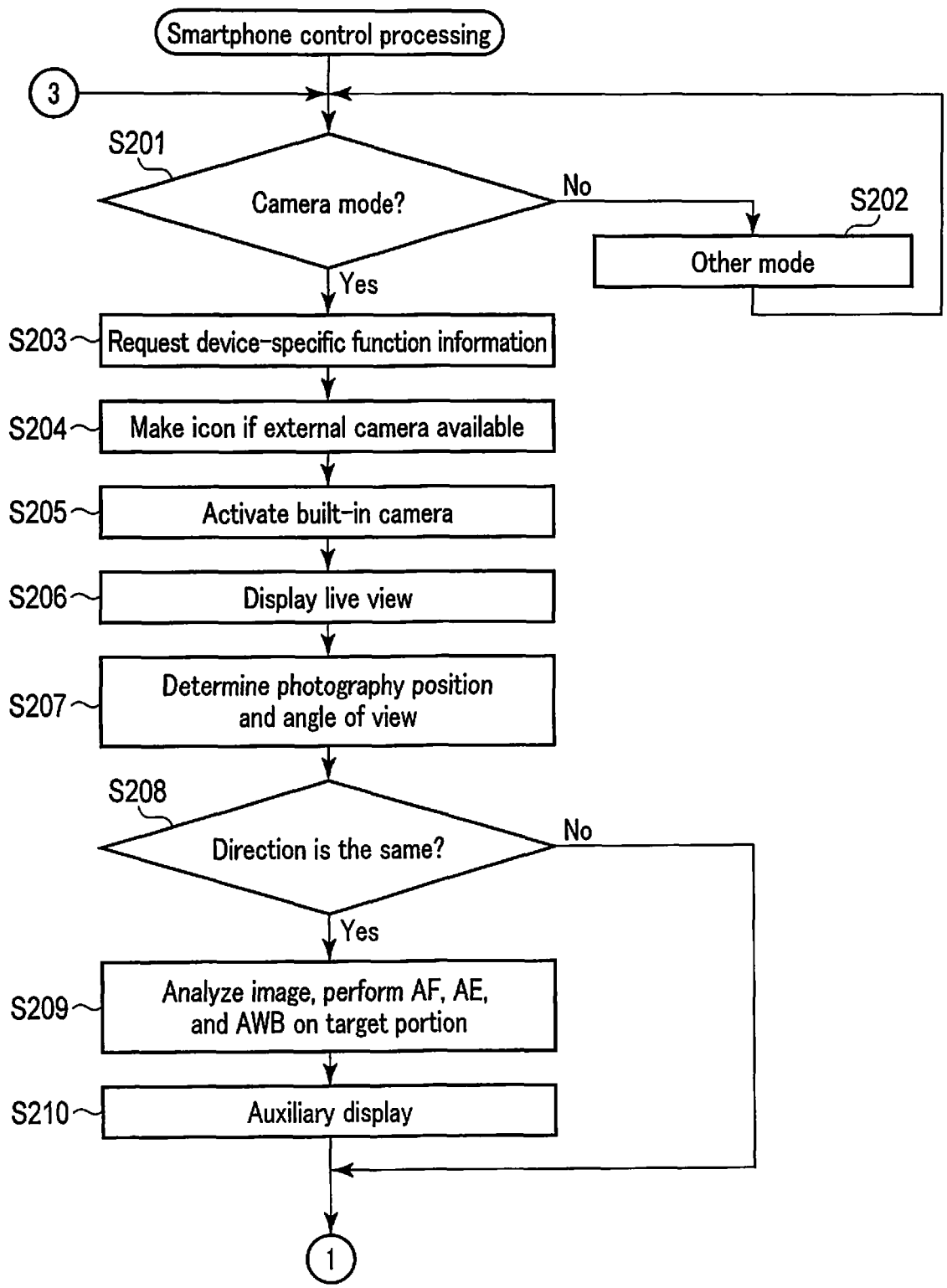
FIG. 8A is a flowchart showing an example of smartphone control processing according to the second embodiment.
Figure 8B:
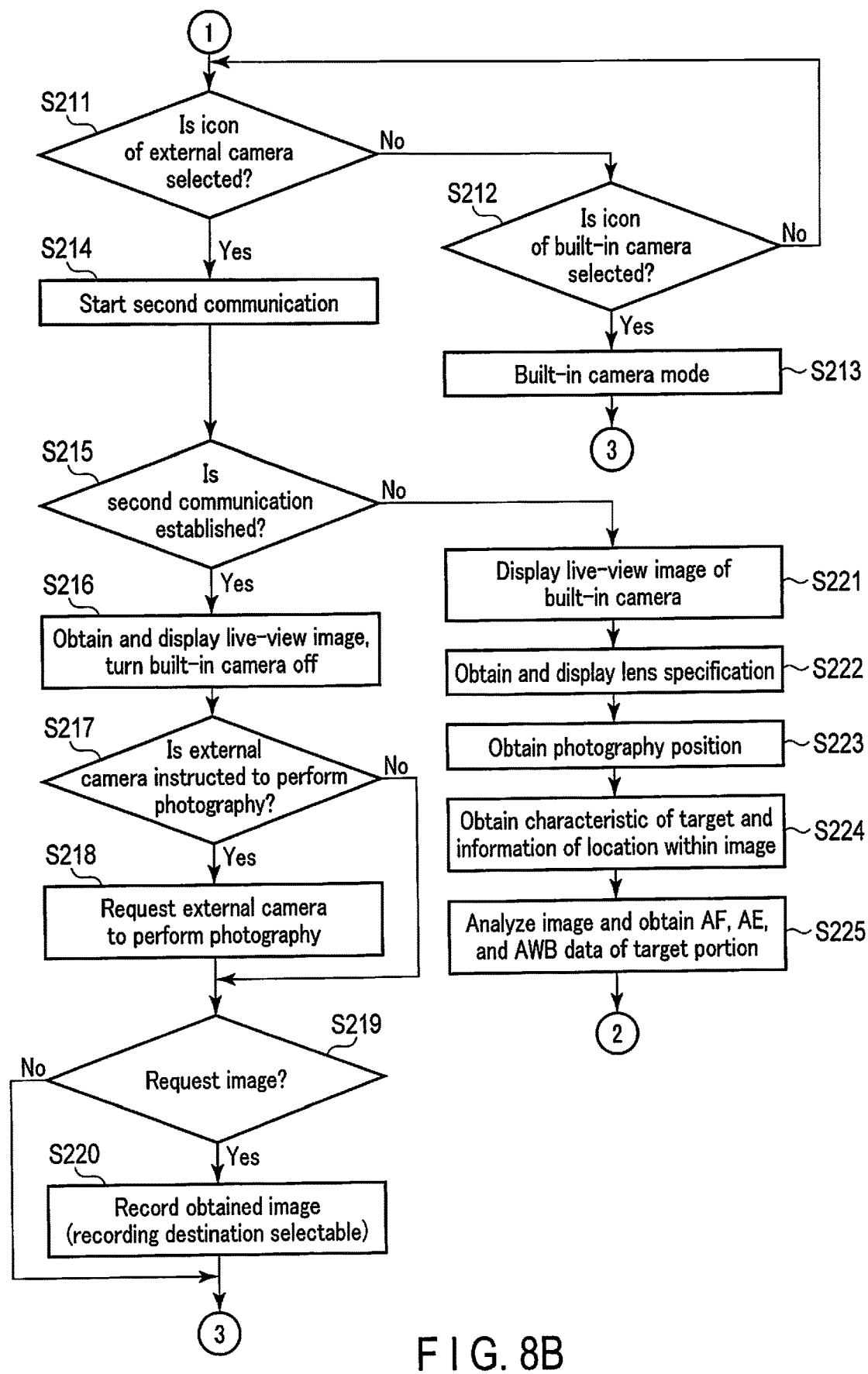
FIG. 8B is a flowchart showing an example of smartphone control processing according to the second embodiment.
Figure 8C:
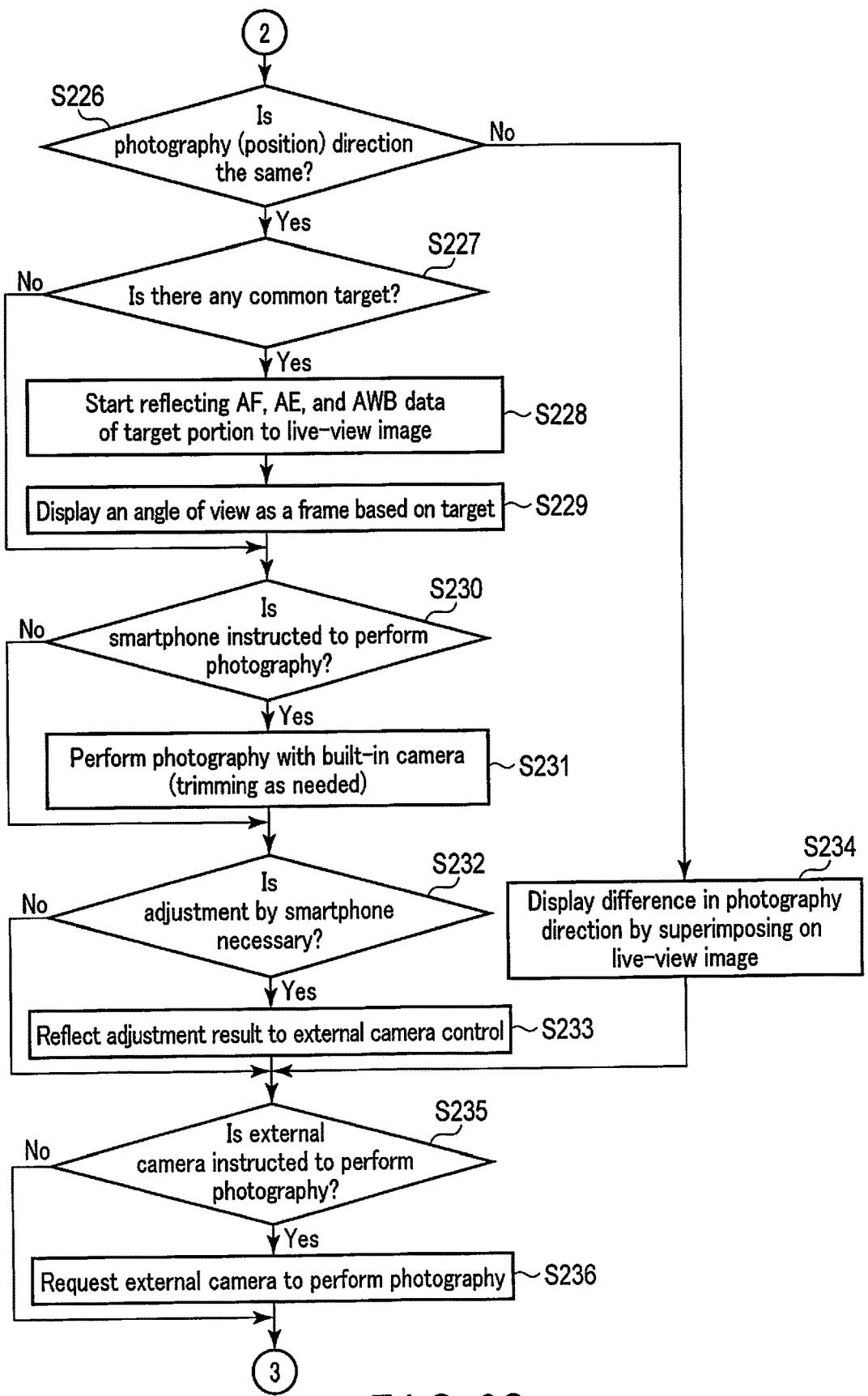
FIG. 8C is a flowchart showing an example of smartphone control processing according to the second embodiment.

An example of the smartphone control processing according to the second embodiment is illustrated as flowcharts in FIGS. 8A, 8B, and 8C, and the operation of the control system 1 according to the present embodiment will be explained with reference to the flowcharts, using an example of selecting a camera mode.

In step S201, after displaying a list of function-specific icons, the controller 110 determines whether a camera mode is selected or not. The processing proceeds to step S202 if it is determined that a camera mode is not selected, for example when a built-in function including a specific function other than a camera mode is selected, or if nothing is selected, and proceeds to step S203 if it is determined that a camera mode is selected. In step S202, the controller 110 performs various processing related to the selected built-in function of the smartphone 100. Thereafter, the processing returns to step S201.

In step S203, since a camera mode is selected, the controller 110 requests device-specific function information from the first camera 300 and the second camera 400 using a first communication. Thereafter, the controller 110 records the obtained device-specific function information in the function-specific external device DB 131.

In step S204, the controller 110 reads icon information from the function-specific external device DB 131 when a specific external device is detected, and causes the display 160 to display an icon indicating the specific external device and an icon indicating the specific function unit. Herein, suppose only the first camera 300 is detected. In such a case, the controller 110 causes the display 160 to display three icons that respectively indicate the built-in front camera unit 141, the built-in rear camera unit 142, and the first camera 300.

The controller 110 generates a control signal to turn the power of the first camera 300 on, and transmits the signal to the first camera 300 through a first communication. Furthermore, if the specific external function unit of the first camera 300 has a plurality of specific external function modules to execute a plurality of specific external functions, the control signal includes a signal to designate which specific external function module to activate.

In step S205, the controller 110 activates the photography function of the smartphone 100. Since at least it is obvious that a user wants to use the photography function, the built-in front camera unit 141 or the built-in rear camera unit 142 is activated in this step. Hereinafter, suppose the built-in rear camera unit 142 is activated. In step S206, the controller 110 obtains an image from the built-in rear camera unit 142, and causes the display 160 to start a live-view display.

In step S207, the controller 110 determines a photography position (posture) and an angle of view. In this step, the controller 110 refers to the function-specific external device DB 131, or conducts a first communication to obtain, for example, a focal distance and an output value of the sensor 380, such as an electronic compass, etc., from the first camera 300 detected in step S204, to determine a photography position and an angle of view of the first camera 300. The information unique to the first camera 300, such as a focal distance, may be obtained in advance in step S203. The direction/angle of view determining unit 180 further determines a direction of photography and an angle of view of the built-in rear camera unit 142 of the smartphone 100.

In step S208, the controller 110 determines whether the direction of photography by the built-in rear camera unit 142 of the smartphone 100 and the direction of photography by the first camera 300 are the same or not based on a result of the determination in step S207. Herein, the directions are determined to be the same when, for example, a user has already prepared the first camera 300 and the direction of photography of the smartphone 100 and that of the first camera 300 match. The case where a user prepares the first camera 300 when they see a notification, etc. displayed in step S204 is also included in the case where a user has already prepared the first camera 300. On the other hand, it is determined that the cameras are not in the same direction if the camera is left in a bag, in addition to the case when the direction of photography by the first camera 300 is different, even when the first camera 300 has already been prepared. The processing proceeds to step S209 when the directions are the same, and proceeds to step S211 when the directions are not the same.

In step S209, the controller 110 has the first camera 300 analyze the image obtained by the imaging unit 340. In this step, for the image obtained by the imaging unit 340, the controller 310 of the first camera 300, for example, obtains setting-related information including information of an angle of view at the time of obtaining the image and a focus of the image. The image characteristic extracting unit 360 extracts a characteristic portion of the image. The controller 310 performs auto focus (AF), automatic exposure (AE), automatic white balance (AWB) in accordance with the characteristic portion of the image as a target portion. The controller 310 transmits information related to the setting of the first camera 300, such as parameters used in AF, AE, and AWB, to the smartphone 100 through a first communication. The controller 110 obtains the information.

In step S210, the controller 110 performs an auxiliary display based on the information obtained in step S209. The processing then proceeds to step S211.

In step S211, the controller 110 determines whether or not, for example, the icon indicating a specific external device, which is the icon indicating the first camera 300, is selected based on, for example, an output of the operation unit 150 in accordance with a user's operation. The processing proceeds to step S214 when it is determined that an icon indicating a specific external device is selected, and proceeds to step S212 when it is determined that the icon is not selected.

In step S212, the controller 110 determines whether the icon indicating the built-in front camera unit 141 or the built-in rear camera unit 142 is selected or not. The processing proceeds to step S213 when it is determined that the icon indicating the built-in front camera unit 141 or the built-in rear camera unit 142 is selected, and returns to step S211 when it is determined that the icon is not selected.

In step S213, the controller 110 executes an operation related to the photography function by the selected built-in front camera unit 141 or built-in rear camera unit 142. The operation related to the function is similar to the operation executed when the icon indicting the specific function unit 14a is selected in step S111. After the operation related to the built-in photography function, the processing returns to step S201.

In step S214, the controller 110 starts a second communication with the first camera 300. In step S215, the controller 110 determines whether the second communication is established or not. The processing proceeds to step S216 when it is determined that the second communication is established, and proceeds to step S221 when it is determined that the second communication is not established.

In step S216, the controller 110 obtains an image generated by the imaging unit 340 from the first camera 300 through a second communication, and causes the display 160 to display the image to start a live-view display. The active built-in rear camera unit 142 is turned off.

In step S217, the controller 110 determines whether or not a photography instruction should be sent to the first camera 300 based on, for example, an output of the operation unit 150 in accordance with a user's operation. The processing proceeds to step S218 when the photography instruction is sent, and proceeds to step S219 when the photography instruction is not sent.

In step S218, since the second communication is occupied by a communication related to a live-view display, the controller 110 transmits a control signal for instructing the first camera 300 to perform photography using, for example, a first communication. If it is possible to transmit the control signal through a second communication, the control signal may be transmitted through either a first communication or a second communication.

In step S219, the controller 110 determines whether or not an image should be requested from the first camera 300 based on, for example, an output of the operation unit 150 in accordance with a user's operation. The processing proceeds to step S220 if it is determined that an image is requested, and returns to step S201 if not requested. In step S220, the controller 110 records the image. At this time, the controller 110 determines in which recording region, among the recording unit 130 of the smartphone 100, the recording unit 330 of the first camera 300, the external medium connected to the smartphone 100, or the external recording medium connected to the first camera 300, the image should be recorded based on, for example, an output of the operation unit 150 in accordance with a user's operation. After the recording, the processing returns to step S201.

In the manner as described above, the control system 1 according to the present embodiment presents, along with a specific function unit, a specific external device that can execute a specific external function similar to or related to the user's selected specific function of the smartphone 100. Thus, a user can know whether there is a specific external device that can be used in cooperation with the smartphone 100 only by selecting a built-in function of the smartphone 100, and can easily expand the function of the smartphone 100 only by selecting the specific external device.

A second communication is, for example, Wi-Fi, and such a communication may not be easily established, as it requires time to be established. Hereinafter, a case where it is determined that a second communication is not established in step S215 is explained. It should be noted, however, a first communication can be established at this time.

In step S221, the controller 110 continues a live-view display based on the image obtained by the built-in rear camera unit 142 of the smartphone 100, as a second communication cannot be established and an image that is photographed by the first camera 300 cannot be obtained.

In step S222, the controller 110 obtains the specification of the lens of the first camera 300 through a first communication, and causes the display 160 to display it. The specification of the lens obtained herein includes, for example, a focal distance.

In step S223, the controller 110 obtains a photography position by the first camera 300 through a first communication. In step S224, the controller 110 transmits, through a first communication, a control signal for causing the first camera 300 to extract characteristics of a subject of photography and to obtain location information of the characteristics within the image, and receives and obtains the information obtained by the first camera 300. In step S225, the controller 110 causes the first camera 300 to obtain information of the image related to, for example, controlling of the first camera 300, based on an analysis of the image through a first communication. The information includes information related to the setting of the first camera 300, such as AF, AE, and AWB data of a target portion in the image. The controller 110 has the first camera 300 transmit the information through a first communication, and obtains it.

In step S226, the controller 110 compares the photography position of the first camera 300 that is obtained in step S223 with the photography position of the built-in rear camera unit 142 of the smartphone 100 that is output from the direction/angle of view determining unit 180, and determines whether the direction or the photography position is the same between the first camera 300 and the smartphone 100. The processing proceeds to step S227 when it is determined that the direction or the photography position is the same, and proceeds to step S234 when it is determined that the direction or the photography position is not the same.

In step S227, the controller 110 determines whether or not a common target is included in the image based on the image obtained by the built-in rear camera unit 142 of the smartphone 100, the characteristics of the target obtained in step S224, and the information of the location of the characteristics within the image. The processing proceeds to step S228 when it is determined that there is a common target, and proceeds to step S230 when it is determined that there is no common target.

In step S228, the controller 110 starts processing to reflect information related to the setting of the first camera 300, such as the parameters used for AF, AE, and AWB of the target portion, which are obtained based on the analysis of the image in step S225, to an image for a live-view display, which is obtained by the built-in rear camera unit 142 of the smartphone 100. In step S229, the controller 110 starts processing to add an auxiliary display, such as a frame corresponding to an angle of view of the first camera 300, to an image for a live-view display, which is obtained by the built-in rear camera unit 142, based on the information obtained from the first camera 300 from step S222 to step S224. In other words, a user can virtually check an image assumed to be obtained by the first camera 300 by the processing in step S228 and step S229 based on information obtained through a first communication, even when a second communication is not established.

In step S230, the controller 110 determines whether or not photography is performed using the built-in rear camera unit 142 of the smartphone 100 based on, for example, an output from the operation unit 150 in accordance with a user's operation. The processing proceeds to step S231 if it is determined that photography is performed, and proceeds to step S232 if not performed. In step S231, the controller 110 performs photography using the built-in rear camera unit 142. Trimming may be performed on the obtained image as needed so that the image can fit in, for example, the frame displayed in the processing in step S229.

In step S232, the controller 110 determines whether or not parameters related to photography, such as a focus and an angle of view of the first camera 300, should be adjusted by the smartphone 100 based on, for example, an output from the operation unit 150 in accordance with a user's operation. The processing proceeds to step S233 when it is determined that the parameters are adjusted, and proceeds to step S235 when it is determined that the parameters are not adjusted. In step S233, the controller 110 causes the first camera 300 to reflect a result of the adjustment to the camera control through a first communication.

In step S234, since the direction or position of photography is not the same between the smartphone 100 and the first camera 300, the processing to superimpose the difference of the direction of photography on the live-view display obtained by the built-in rear camera unit 142 is started. The difference in the direction of photography is calculated based on, for example, information obtained from step 222 to step 225 and an output from the electronic compass. In this step, the difference may be indicated by displaying a synthesis of images with a shift in accordance with a degree of the difference, or by displaying a frame, etc. corresponding to an angle of view obtained by the first camera 300 on the live-view image. Furthermore, the displaying of the difference may be a notification of the difference, an indication of the degree of the difference by a numerical value, or a display of graphics showing a difference from an angle of view of the image obtained by the first camera 300.

In step S235, the controller 110 determines whether or not the controller makes the first camera 300 perform photography with a current setting based on, for example, an output from the operation unit 150 in accordance with a user's operation. The processing proceeds to step S236 if it is determined that the first camera 300 is made to perform photography, and returns to step S201 if it is determined to not perform photography.

In step S236, the controller 110 transmits a control signal to the first camera 300 through a first communication, similarly to step S218, and makes the first camera 300 perform photography. The controller 110 makes the first camera 300 record the image. At this time, the controller 110 determines in which recording region, among the recording unit 330 of the first camera 300 or the external recording medium connected to the first camera 300, the image should be recorded based on, for example, an output of the operation unit 150 in accordance with a user's operation. After the recording, the processing returns to step S201.

Figure 9A:
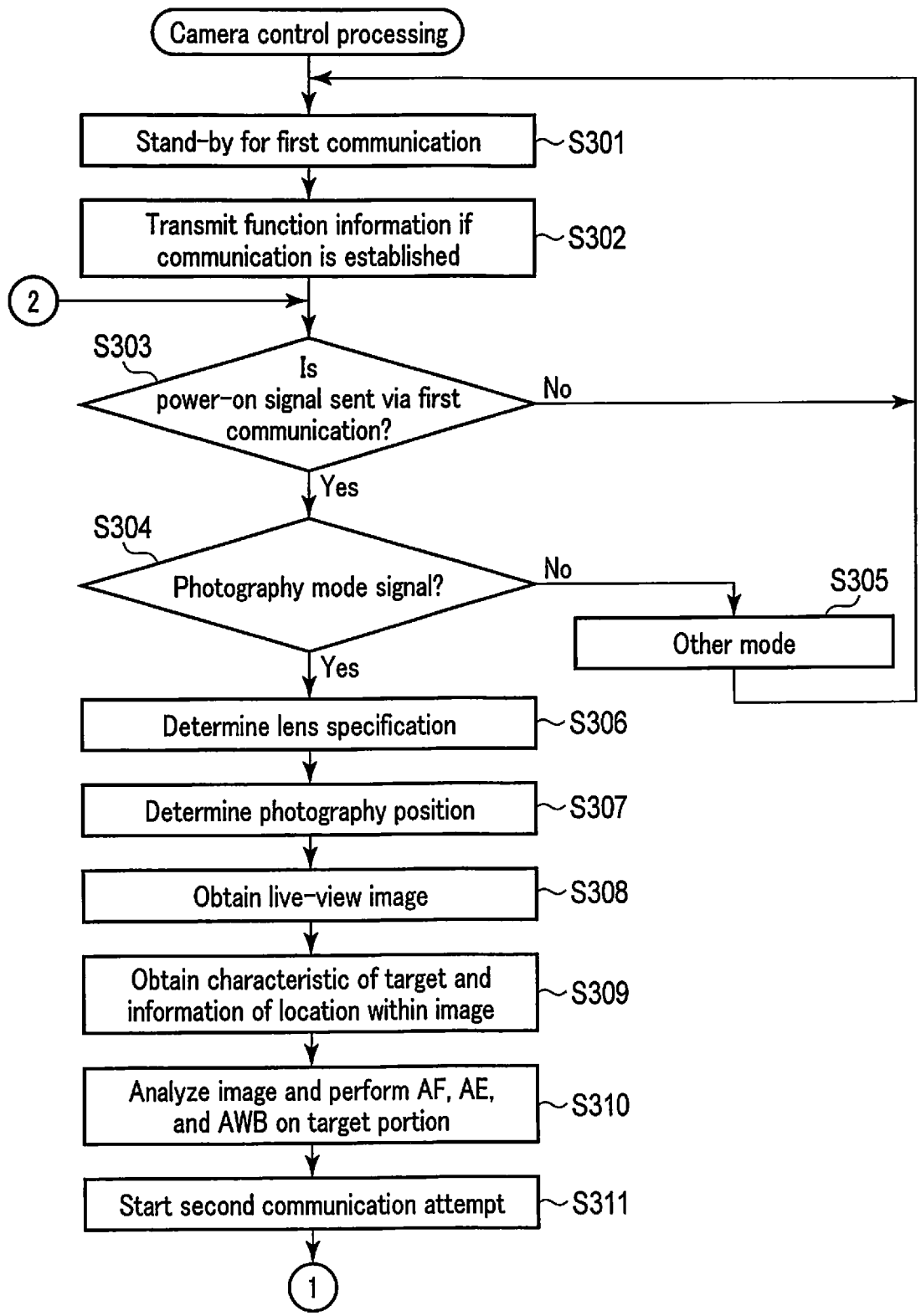
FIG. 9A is a flowchart showing an example of camera control processing according to the second embodiment.
Figure 9B:
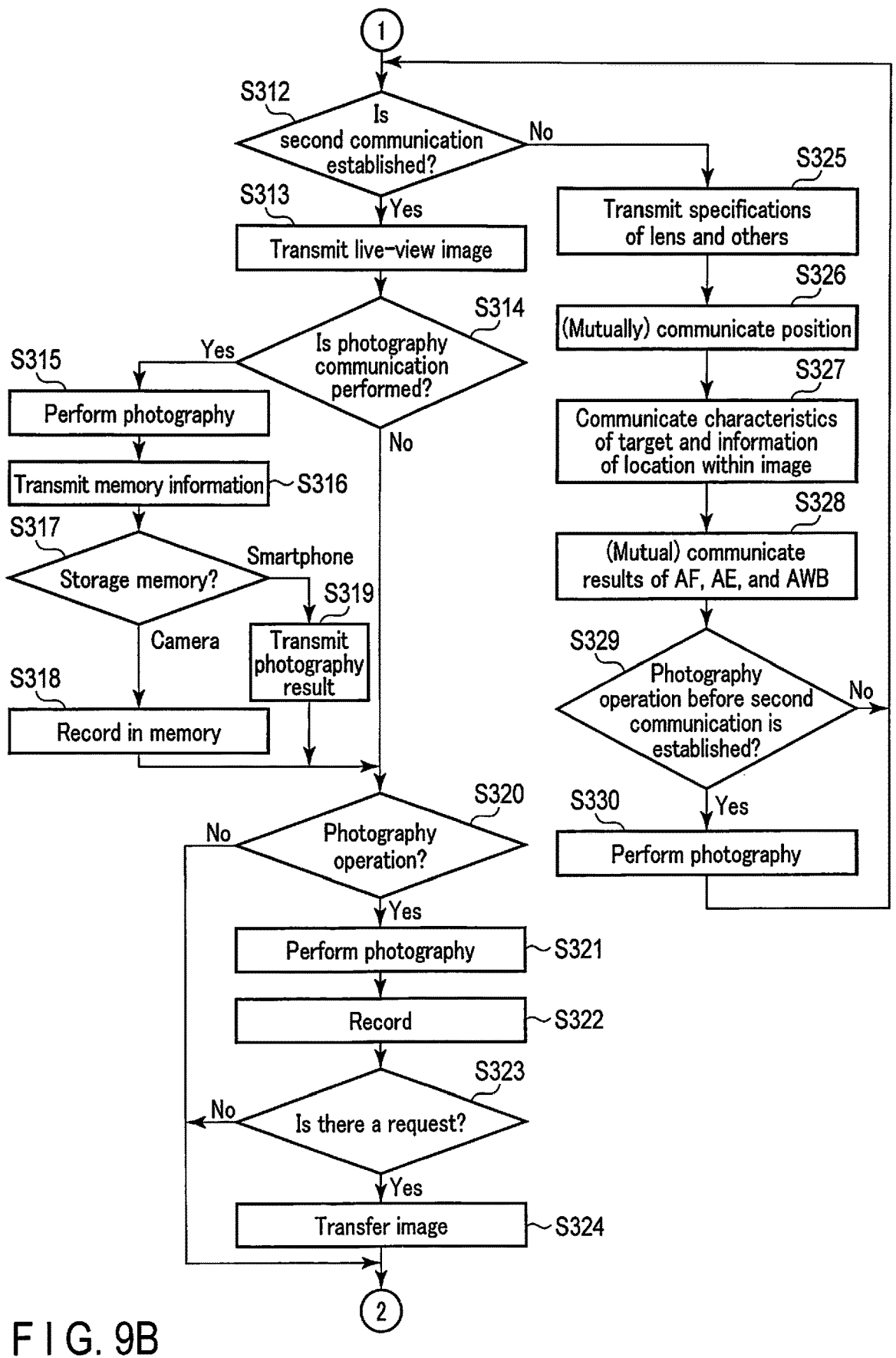
FIG. 9B is a flowchart showing an example of camera control processing according to the second embodiment.

An example of the camera control processing according to the second embodiment is illustrated as flowcharts in FIGS. 9A and 9B, and the operation of the control system 1 according to the present embodiment will be explained with reference to the flowcharts, using an example of selecting the first camera 300 as a specific external device.

In step S301, the controller 310 places the first camera 300 in a stand-by state until a first communication sent from the smartphone 100 is received. If a first communication is received from the smartphone 100, the processing proceeds to step S302.

In step S302, the controller 310 determines whether or not function information is requested by the first communication sent from the smartphone 100. If it is determined that the function information is requested, the controller 310 reads the function information of itself from the function information storage unit 331, and transmits the information to the smartphone 100 through a first communication. The processing is not performed if the function information is not requested. The operation of this step corresponds to step S203.

In step S303, the controller 310 determines whether or not a control signal to turn the power on from the smartphone 100 through a first communication. The processing proceeds to step S304 if it is determined that the signal is received, and returns to step S301 if not received. The operation of this step corresponds to step S204.

In step S304, the controller 310 determines whether or not a photography mode signal is received from the smartphone 100 through a first communication. In this step, the processing is performed when, for example, the first camera 300 includes a specific external function module for executing a specific external function other than a photography function. The processing proceeds to step S306 if it is determined that a photography mode signal is received, and proceeds to step S305 if a signal other than a photography mode signal is received. The operation of this step corresponds to step S204. In step S305, the processing determines to which mode the processing is shifted based on the signal received in step S304, and starts the processing to execute the mode. Thereafter, the processing returns to step S301.

In step S306, the controller 310 determines and obtains the specification of the lens of the first camera 300. In step S307, the controller 310 determines and obtains a photography position including a current direction of the first camera 300, for example. In step S308, the controller 310 causes the imaging unit 340 to perform photography and obtains an image. In step S309, the controller 310 or the image characteristic extracting unit 360 analyzes the image obtained in step S308 to obtain characteristics of a target of the photography and information of the location of the target within the image. In step S310, the controller 310 analyzes the image and performs processing to obtain information related to the setting of the first camera 300, such as AF, AE, and AWB, for a target portion in accordance with a result of the analysis.

The information obtained from step S306 to step S310 is transmitted to the smartphone 100 using, for example, a first communication. The information may be transmitted every time it is obtained, or may be transmitted after step S310. The information is used to determine a photography position and an angle of view and an auxiliary display, etc. in step S207 to step S210 after being transmitted to the smartphone 100. Herein, the image obtained in step S308 is not transmitted by a first communication.

Thereafter, when the first camera 300 is selected as a specific external device having a photography function in step S211 of the smartphone control processing, and an operation to establish a second communication is started in step S214, the controller 310 similarly starts an operation to establish a second communication in step S311 of the camera control processing.

In step S312, the controller 310 determines whether a second communication is established or not. The processing proceeds to step S313 when it is determined that a second communication is established, and proceeds to step S325 when it is determined that a second communication is not established. This step corresponds to step S215.

In step S313, the controller 310 starts an operation to transmit display information for a live-view display to the smartphone 100 through a second communication based on the image obtained by the imaging unit 340 in step S308. This step corresponds to step S216.

In step S314, the controller 310 determines whether or not a photography instruction is received through a first communication. The processing proceeds to step S315 when the instruction is received, and proceeds to step S320 when the instruction is not received. This step corresponds to step S218.

In step S315, the controller 310 causes the imaging unit 340 to perform a photography operation. In step S316, the controller 310 transmits information of a storage medium of the first camera 300 through a first communication to the smartphone 100 as memory information. The storage medium includes, for example, the recording unit 330 and an external memory connected to the first camera 300. An external memory includes, for example, an SD card. In step S317, the controller 310 determines in which recording medium the obtained image should be recorded based on a result received from the smartphone 100 through a first communication. If it is determined that the obtained image is recorded in the recording unit 330 or in the external memory connected to the first camera 300, the processing proceeds to step S318, and if it is determined that the obtained image is recorded in the recording unit 130 or in the external memory connected to the smartphone 100, the processing proceeds to step S319. In step S318, the controller 310 records the image in the recording unit 330 or the external memory connected to the first camera 300. In step S319, the controller 310 transmits the data of the image to the smartphone 100 through a second communication. The processing from step S316 to step S319 may not be necessarily performed if it is determined that the image is not to be recorded based on, for example, an output of the operation unit 150. The processing from step S316 to step S319 corresponds to step S220.

In step S320, the controller 310 determines whether or not photography is performed only by the first camera 300 based on, for example, an output from the operation unit 350 in accordance with a user's operation. A case of determining that photography is performed only by the first camera 300 in this step includes a case where a user operates the operation unit 350 of the first camera 300 to perform photography. Accordingly, after this step, a user performs a photography operation by operating the operation unit 350 of the first camera 300. The processing proceeds to step S321 when photography is performed, and returns to step S303 when photography is not performed. At this time, the first camera 300 is turned off. Then, the processing stays on stand-by until a control signal to turn the power on is received from the smartphone 100. In step S321, the controller 310 starts a photography operation based on, for example, an output from the operation unit 350 in accordance with a user's operation. In step S322, the controller 310 records the image obtained by photography. The controller 310 may determine a recording destination based on, for example, an output of the operation unit 350, similar to step S317. In step S323, the controller 310 determines whether the image obtained in step S321 should be transmitted to the smartphone 100 or not based on, for example, an output of the operation unit 350, or an output of the operation unit 150 obtained through a first communication with the smartphone 100. The processing proceeds to step S324 if it is determined that the image is transmitted, and returns to step S303 if it is determined that the image is not transmitted. In step S324, the controller 310 transmits the image to the smartphone 100 through a second communication. Thereafter, the processing returns to step S303.

Herein, an operation when it is determined that a second communication is not established in step S312 is described. The operation from step S325 to step S330 corresponds to the operation from step S221 to step S236, and the communication with the smartphone 100 herein is conducted using a first communication.

In step S325, the controller 310 transmits the specification of the first camera 300, such as a lens, etc. to the smartphone 100. In step S326, the controller 310 mutually communicates with the smartphone 100 about a photography position of the first camera 300. The controller 310 transmits the photography position of the first camera 300 to the smartphone 100, obtains a result of a user's operation obtained by the operation unit 150 in the smartphone 100 and reflects the position to the result. In step S327, the controller 310 analyzes the image obtained by the first camera 300 and obtains characteristics of a target within the image and information of the location of the characteristics within the image. Thereafter, the controller 310 transmits the obtained information to the smartphone 100. In step S328, the controller 310 mutually communicates, with the smartphone 100, information related to the setting of the first camera 300, such as parameters of AF, AE, and AWB when or after obtaining the image. The controller 310 transmits a result of each of the information related to the setting of the first camera 300, such as AF, AE, and AWB, to the smartphone 100, and obtains a result of a user's operation obtained by the operation unit 150 in the smartphone 100, and reflects the information to the controlling of the first camera 300.

In step S329, the controller 310 determines whether or not a photography instruction transmitted from the smartphone 100 in step S236 is received. In other words, it is determined whether a user performs photography by the first camera 300 without waiting for a second communication to be established, based on, for example, a result of the user's operation obtained by the operation unit 150. The processing proceeds to step S330 if it is determined that the photography is performed, and returns to step S312 if it is determined that the photography is not performed. In step S330, the controller 310 causes the imaging unit 340 to perform photography and obtains an image. At this time, the controller 310 may determine in which recording region the image should be recorded, similar to step S236.

The control system 1 according to the present embodiment has the following advantages in addition to those achieved in the first embodiment. The control system 1 according to the present embodiment includes a first communication and a second communication, and even when display information including an image for a live-view display is communicated between the smartphone 100 and the first camera 300, it is possible to transmit and receive, through a first communication, information related to the setting of the first camera 300 including parameters related to a photography control, such as a photography instruction and an angle of view. Thus, with the control system 1 according to the present embodiment, a user can set photography settings while checking an image obtained by a specific external device, including the first camera 300, by an image or related information, and a user can perform photography at a desired timing.

Furthermore, the control system 1 according to the present embodiment performs an auxiliary display so that photography setting can be executed through a first communication even when a second communication is not established. A user can start photography as soon as a second communication is established. With the auxiliary display, it is possible for a user to check an image assumed to be obtained when a specific external device, including the first camera 300, is used, and to instruct photography through a first communication and obtain an image even when a second communication is not established.

<Modifications>
(Another Example of Icon Display)

In the second embodiment, an example of the icon indicating the specific function unit including the built-in front camera unit 141 and the built-in rear camera unit 142, and the icon indicating the specific external device including the first camera 300 is illustrated, but is not limited thereto, and the icons may be displayed in a manner as described below.

Figure 10A:
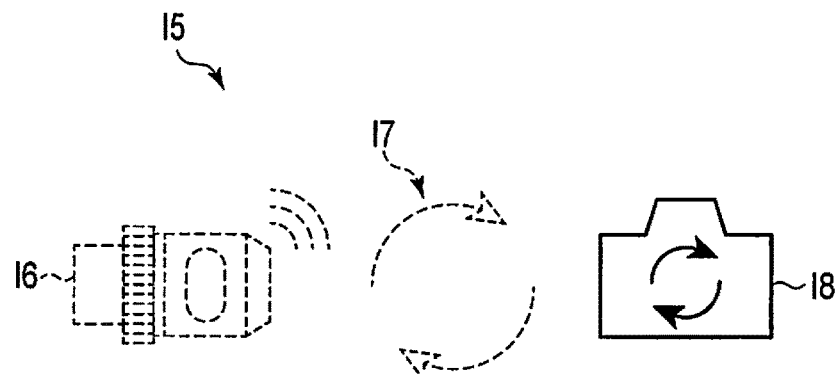
FIG. 10A is a schematic diagram showing an example of an icon display when no specific external devices are connected thereto.

For example, an example of the icon display when the first camera 300 is not connected is shown in FIG. 10A, as a schematic drawing. The icon I5 includes an icon I6, an icon I7, and an icon I8. For example, the icon I6 indicates the state of the first camera 300, the icon I7 indicates whether the first camera 300 can be changed with other devices or a specific function unit, and the icon I8 indicates the state of a specific function unit of the smartphone 100. In FIG. 10A, the icon I6 and the icon I7 are shown in a lighter color than the icon I8, and such a lighter-colored display means the icons are not currently selectable. The display of the icon I5 indicates that only the specific function unit of the smartphone 100 is currently in a usable state. An icon similar to the icon I8 is displayed in the icon I7, and this means that the specific function unit of the smartphone 100 includes a specific function module for executing a plurality of specific functions, like a case where the specific function unit includes, for example, the built-in front camera unit 141 and the built-in rear camera unit 142, and means that a user can select which module to use.

Figure 10B:
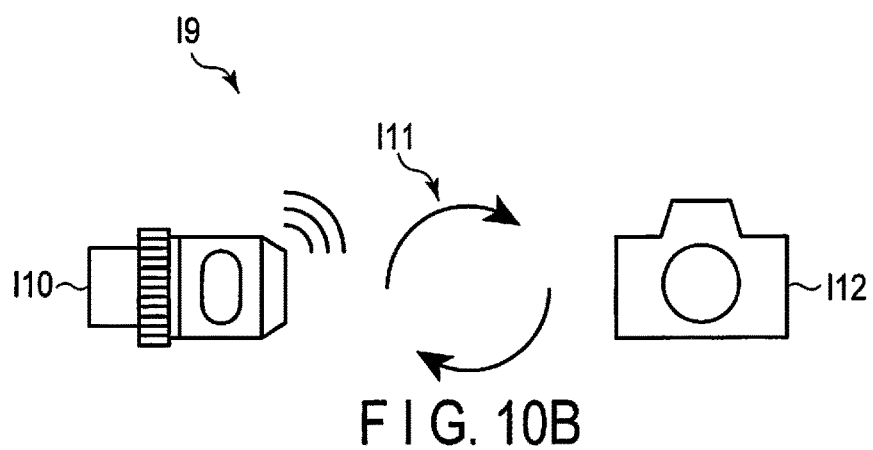
FIG. 10B is a schematic diagram showing an example of an icon display when a specific external device is connected thereto.

An example of the icon display when the first camera 300 is connected is shown in FIG. 10B as a schematic drawing. At this time, the icon I10, the icon I11, and the icon I12 included in the icon I9 are displayed in a thick color like the icon I8, unlike the icons I6 and the icon I7. In other words, both of the first camera 300 indicated by the icon I10 and the specific function unit of the smartphone 100 indicated by the icon I12 are in a usable and selectable state. Accordingly, a display example of the icon I9 shown in FIG. 10B shows that, for example, an icon indicating a specific external device and an icon indicating a specific function unit can be selected.

Figure 10C:
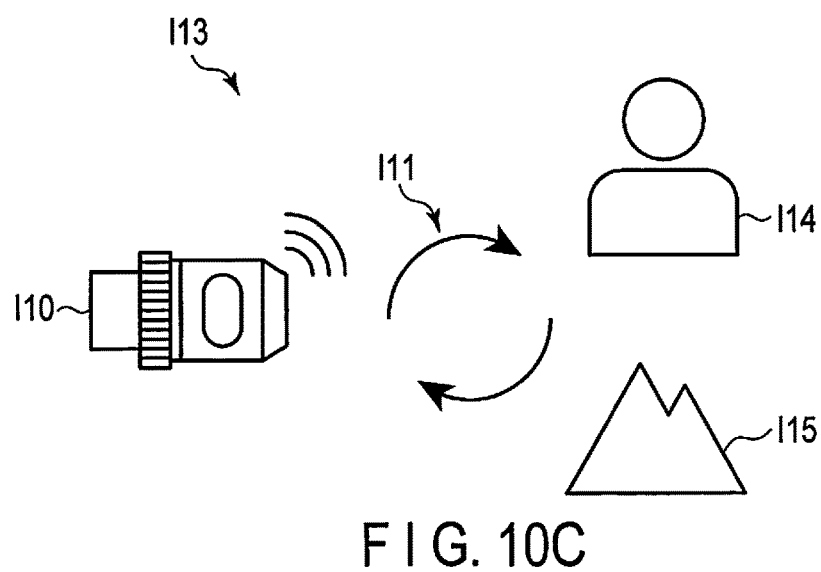
FIG. 10C is a schematic diagram showing another example of an icon display when a specific external device is connected thereto.

Another example of the icon display when the first camera 300 is connected is shown in FIG. 10C as a schematic drawing. The icon I13 displayed herein includes the icon I10, the icon I11, the icon I14, and the icon I15. The meaning of the color density in the icon display is as described above, and herein any specific function unit of the first camera 300 indicated by the icon I10, the built-in front camera unit 141 of the smartphone 100 indicated by the icon I14, and the built-in rear camera unit 142 of the smartphone 100 indicated by the icon I15, can be used and selected.

Herein, an example of the icon display when a specific external device is connected and used is shown in FIG. 10D as a schematic diagram. As shown in FIG. 10D, for example, when the above-described icons are displayed in the display 160, the icon I16 indicating the first camera 300 may be displayed in a dark color when the camera is connected, and in a light color if not connected. Furthermore, as shown in FIG. 10D, for example, a size of the icon I16 indicating the first camera 300 and a size of the icon I17 indicating a specific function unit of the smartphone 100 may be differentiated to express a state of the device or specific function unit indicated by each of the icons. As shown in FIG. 10D, for example, the state of the first camera 300 being used can be expressed by the icon I16, which is displayed larger than the icon I17. Furthermore, a display to present an operation method to a user may be made, like the notification A6.

(Modification Relating to Configuration of Control System)

It is explained in the above that the first camera 300 is attachable to the smartphone 100 with the adapter 190, as shown in FIG. 6; however, the embodiment is not limited thereto. The first camera 300 may be held by a user when used for photography, or may be attached to something other than the smartphone 100.

The control system 1 including a specific external device having a photography function, such as the first camera 300 and the second camera 400, has been explained; however, the present embodiment is not limited thereto. For example, if an audio recording function of the smartphone 100 is selected, the control system 1 may be configured to present an IC recorder if recording can be performed through a communication with the IC recorder. When, for example, music playback is selected in the smartphone 100, the control system 1 may search for and present an external speaker outside of the smartphone 100, or the control system 1 may communicate with a TV or a PC display when video playback is selected, and present a device or specific function unit having a screen display function outside of the smartphone 100, or the control system 1 may present a device or specific function unit having an audio output function, such as a speaker, along with a TV, etc. when a video is played back. The related functions are explained as similar functions herein.

An information communication device, such as the smartphone 100, is described as the control apparatus 10 in the above; however, the embodiment is not limited thereto, as already mentioned. For example, the technology according to the first embodiment and the second embodiment is applicable to a camera functioning as a control apparatus 10. At this time, camera peripheral devices, such as a strobe light, an interchangeable lens, and a tripod, may be presented as a specific external device. As another example, the technology described herein may be applied to a treatment device, such as an endoscope, and an available peripheral device may be presented to a user.

In the above description, the control apparatus 10 is directly operated by a user; however, the present embodiment is not limited thereto. For example, a user may operate the control apparatus 10 via a communication network, such as the Internet, etc. A case where the control apparatus 10 searches for a specific external device nearby, using a first communication is explained in the above; however, the present embodiment is not limited thereto. For example, if a specific external device has location information and is connected to a network, such as the Internet, the control apparatus 10 may search for a specific external device through the network. Herein, the embodiments are described mainly from an aspect of photography; however, the embodiments are widely applicable not only for consumer products, but also to industrial products, observation in medical and bioengineering fields, and in diagnostic devices, as convenient searching for and communication with a peripheral apparatus is useful.

The order of each processing shown in the flowcharts, and each step in each processing may be changed, and the processing and steps may be added or deleted. Each processing is carried out by a program stored in the recording unit 13, the recording unit 23, the recording unit 33, the recording unit 130, and the recording unit 330. Each program may be internally recorded in the control apparatus 10, the first specific external device 20, the second specific external device 30, the smartphone 100, the IC recorder 200, the first camera 300, and the second camera 400 in advance, or may be externally recorded in a separate recording medium. The programs can be recorded in the control apparatus 10, the first specific external device 20, the second specific external device 30, the smartphone 100, the IC recorder 200, the first camera 300, the second camera 400 or the separate recording medium in various ways. They may be recorded at the time of shipping a product, they can be recorded using a distributed recording medium, or they can be downloaded using a communication network, such as the Internet. Not only from the viewpoint of programs, a determination using artificial intelligence (AI), and AI can continuously learn what kind of equipment is frequently selected and used in what kind of scene through determining a user's behavior, or can learn a behavior pattern of a third party in advance, so that search and recommendation of a related device becomes more widely applicable in various fields.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

<Additional Notes>

The above embodiments of the present invention encompass the following inventions:

[1] A control apparatus that includes one or more built-in functions that are selectively usable, the control apparatus comprising:

a built-in function unit configured to execute the built-in function;

at least one control circuit which
determines which of the built-in functions is selected,
determines whether there is an external device to execute an external function similar to the selected built-in function, and
controls a presentation to a user that the selected built-in function is also executable by the external device in addition to the built-in function unit when it is determined that there is the external device; and a communication unit configured to transmit and receive information related to the external device and to executing the external function when the external device is selected.

[2] The control apparatus according to [1], wherein the control circuit searches for the external device by causing the communication unit to conduct a communication with one or more external devices when the built-in function is selected, and determines whether or not there is the external device.

[3] The control apparatus according to [1], further comprising a recording unit, and wherein when the built-in function is selected, the control circuit causes the communication unit to conduct a communication, obtains information related to the external device, the information including correspondence between the built-in function and the external device that executes the external function, and records the information in the recoding unit.

[4] The control apparatus according to [1], further comprising a recording unit configured to record display information for displaying an icon indicating the built-in function unit and an icon indicating the external device, wherein the control circuit carries out the presentation by displaying the icon indicating the built-in function unit and the icon indicating the external device based on the display information.

[5] The control apparatus according to [4], wherein the control circuit makes the communication unit conduct a communication to obtain the display information to display the icon indicating the external device.

[6] The control apparatus according to [1], wherein the control circuit obtains, through a communication conducted by the communication unit, information including a specification and a state of the external device, and generates display information to carry out an auxiliary display based on the information to display a difference between data obtained by the built-in function unit and data obtained by the external device.

[7] The control apparatus according to [1], wherein
the communication unit comprises a first communication unit and a second communication unit,
the first communication unit conducts a first communication including a communication for searching for the external device,
the second communication unit conducts a second communication including a communication including data obtained by the external device, and
the second communication is faster than the first communication.

[8] The control apparatus according to [7], wherein when the second communication is not established, the control circuit generates display information for carrying out an auxiliary information based on the data obtained by the built-in function unit and the information related to setting of the external device obtained from the external device through the first communication.

[9] The control apparatus according to [8], wherein the auxiliary display includes information related to data that is assumed to be obtained from the external device through the first communication when the external device executes the external function, and the control circuit causes the external device to perform an operation related to the external function through the first communication.

[10] A control system comprising:
the control apparatus according to any one of [1] to [9]; and
the one or more external devices.

What is claimed is:

1. A control apparatus that has one or more built-in functions that are selectively usable, the control apparatus comprising:

a plurality of communication units including a first communication unit and a second communication unit;

a built-in function unit configured to execute the built-in function; and at least one control circuit which
    determines which of the built-in functions is selected,
    determines whether or not the selected built-in function includes at least two functions that are executable in conjunction with each other, and
    responsive to a determination that the selected built-in function includes at least two functions that are executable in conjunction with each other,
        determines whether there is an external device which has an external function related to any of the functions included in the selected built-in function based on a first communication conducted by the first communication unit,
        controls an icon display to present to a user that the selected built-in function is also executable by the external device in addition to the built-in function unit when it is determined that there is the external device, and
        responsive to selection of the external device in accordance with the icon display, (1) causes the second communication unit to communicate with the external device through a second communication to execute the external function, and (2) causes the built-in function unit to execute another function included in the selected built-in function, thereby simultaneously using the built-in function unit and the external device in conjunction and executing the selected built-in function.

2. The control apparatus according to claim 1, wherein the control circuit searches for the external device by causing the first communication unit to conduct a communication with the one or more external devices when the built-in function is selected, and determines whether or not there is the external device.

3. The control apparatus according to claim 1, wherein the control circuit obtains, through a communication conducted by the communication unit, information including a specification and a state of the external device, and generates display information to carry out an auxiliary display based on the information to display a difference between data obtained by the built-in function unit and data obtained by the external device.

4. The control apparatus according to claim 3, wherein the auxiliary display includes information related to data that is assumed to be obtained from the external device through the first communication when the external device executes the external function, and
    the control circuit causes the external device to perform an operation related to the external function through the first communication.

5. The control apparatus according to claim 1, wherein
    the first communication unit conducts the first communication including a communication for searching for the external device,
    the second communication unit conducts the second communication including a communication that includes data obtained by the external device, and
    the first communication consumes less power compared to the second communication.

6. The control apparatus according to claim 1, wherein
    the first communication unit conducts a transitory command communication,
    the second communication conducts a continuous communication including obtaining sequential data obtained by the external device, and
    the second communication is faster than the first communication.

7. The control apparatus according to claim 1, wherein
    the control circuit determines a scene of a user's device usage, specifies the external function that is required in the determined scene, and switches information used for the first communication to information used for searching for an external device capable of executing the specified external function.

8. A control system comprising:
    the control apparatus according to claim 1, and
    the one or more external devices.

9. The control apparatus according to claim 1, wherein the selected built-in function is a video shooting function that includes a photography function and an audio recording function, and
    the at least one control circuit causes the external device to execute the audio recording function, and causes the built-in function unit to execute the photography function.

10. A method for controlling a control apparatus that has one or more built-in functions that are selectively usable, the method comprising:
    conducting a plurality of communications including a first communication and a second communication;
    executing the built-in function;
    determining which of the built-in functions is selected;
    determining whether or not the selected built-in function includes at least two functions that are executable in conjunction with each other; and
    responsive to a determination that the selected built-in function includes at least two functions that are executable in conjunction with each other,
        determining whether there is an external device which has an external function related to any of the functions included in the selected built-in function based on the first communication;
        controlling an icon display to present to a user that the selected built-in function is also executable by the external device in addition to the built-in function unit when it is determined that there is the external device;
    and
        responsive to selection of the external device in accordance with the icon display, (1) communicating with the external device through the second communication to execute the external function, and (2) causing the built-in function to execute another function included in the selected built-in function, thereby simultaneously using the build in function and the external device in conjunction and executing the selected built-in function.

11. A control method for an apparatus that has at least one built-in function, each being selectively usable, the control method comprising:
    displaying a list of at least one function corresponding to the at least one built-in function;
    receiving a user selection of one of the at least one built-in function displayed;
    determining whether or not the selected built-in function includes at least two functions that are executable in conjunction with each other; and
    responsive to a determination that the selected built-in function includes at least two functions that are executable in conjunction with each other,
        determining whether there is an external device having an external function corresponding to any of the at least two functions included in the selected built-in function based on a first communication using a first communication type;

responsive to a determination that there is an external device having an external function corresponding to any of the at least two functions included in the selected built-in function, displaying an icon representation of the external function; and responsive to a user selection of the external function displayed, communicating with the external device with second communication using a second communication type to execute the external function, causing the apparatus and the external device to cooperatively perform the at least two functions included in the selected built-in function.

* * * * *